United States Patent
Fujimori et al.

(10) Patent No.: US 7,270,418 B2
(45) Date of Patent: Sep. 18, 2007

(54) OPTICAL DEVICE AND PROJECTOR

(75) Inventors: Motoyuki Fujimori, Suwa (JP); Masami Murata, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 175 days.

(21) Appl. No.: 11/020,698

(22) Filed: Dec. 27, 2004

(65) Prior Publication Data

US 2005/0185142 A1    Aug. 25, 2005

(30) Foreign Application Priority Data

Dec. 26, 2003    (JP)    ............... 2003-433306

(51) Int. Cl.
G03B 21/18    (2006.01)
G03B 21/26    (2006.01)
G03B 21/16    (2006.01)

(52) U.S. Cl. .......................... 353/54; 353/52

(58) Field of Classification Search ................ 353/52, 353/54, 60, 119, 122, 31; 349/161
See application file for complete search history.

(56) References Cited

U.S. PATENT DOCUMENTS

2002/0163625 A1    11/2002    Tabuchi et al.
2002/0191158 A1    12/2002    Koyama et al.
2004/0233632 A1*    11/2004    Chang ..................... 361/687
2006/0191677 A1*    8/2006    Viczena ..................... 165/260

FOREIGN PATENT DOCUMENTS

| JP | A 01-159684 | 6/1989 |
| JP | A 03-174134 | 7/1991 |
| JP | A 2002-268038 | 9/2002 |
| JP | A 2002-357865 | 12/2002 |
| WO | WO 02/19027 A1 | 3/2002 |

* cited by examiner

Primary Examiner—Melissa Jan Koval
Assistant Examiner—Andrew Kong
(74) Attorney, Agent, or Firm—Oliff & Berridge, PLC

(57) ABSTRACT

An optical device body (440) includes: three optical modulator holders (446) respectively holding three liquid crystal panels (441) and having cooling chambers with cooling fluid sealed therein to respectively cool the three liquid crystal panels (441) with the cooling fluid in the respective cooling chambers; a plurality of fluid circulators (448) intercommunicated with the three optical modulator holders (446) to guide the cooling fluid to the outside of the respective cooling chambers and re-introduce the cooling fluid into the respective cooling chambers; and a flow volume changer (449) disposed in a flow path of the cooling fluid and capable of changing flow volumes of the cooling fluid flown into the respective optical modulator holders (446) in accordance with heat values of the three liquid crystal panels (441).

16 Claims, 14 Drawing Sheets

OPTICAL DEVICE AND PROJECTOR

BACKGROUND OF THE INVENTION

1. Field of the Invention

The present invention relates to an optical device and a projector.

2. Description of Related Art

Conventionally, there has been known a projector having a plurality of optical modulators that modulate a light beam irradiated from a light source in accordance with image information to form an optical image, a color-combining optical device that combines and irradiates the light beam modulated by the optical modulator, and a projection optical device that projects the light beam combined by the color-combining optical device in an enlarged manner.

As the optical modulator, for instance, an arrangement including an active matrix driven liquid crystal panel that has an electrooptic material such as a liquid crystal sealed between a pair of boards, and a polarization plate that only transmits light beams having a predetermined optical axis is widely used.

Specifically, the pair of boards included in the liquid crystal panel has: a drive board disposed on a light-irradiation side and provided with a data line, a scan line, a switching element, a pixel electrode, etc. for applying driving voltage to the liquid crystal; and an opposing board disposed on a light-incident side and provided with a common electrode, a black mask, etc.

When the light beam irradiated from the light source is irradiated on the liquid crystal panel, the liquid crystal panel tends to be subjected to the temperature rise due to light absorption of the data line and the scan line formed on the driving board and the black matrix (translator's comment: black mask) formed on the opposing board as well as light absorption of the liquid crystal layer. Further, among the light beams irradiated from the light source and transmitted through the liquid crystal panel, the light beam not having the predetermined optical axis is absorbed by the polarization plate, which easily causes generation of heat on the polarization plates.

Therefore, for projectors having such optical modulators therein, an arrangement having a cooling device using a cooling fluid has been proposed for restraining temperature rise of the optical modulator (see, for example, Patent Document 1: JP Hei 3-174134A).

The cooling device disclosed in the Patent Document 1 is formed with a case having a substantially rectangular parallelepiped shape with its opposing sides opened, which includes a cooling chamber adapted to seal a cooling fluid therein. A liquid crystal panel is disposed on one side of the opposing sides while a polarization plate is disposed on the other side, so that openings of the opposing sides are closed with the liquid crystal panel and the polarization plate to form the cooling chamber. With such arrangement, the heat generated on the liquid crystal panel and the polarization plate due to the light beam irradiated from the light source is directly released to the cooling fluid.

However, in the cooling device disclosed in the Patent Document 1, since the cooling fluid is sealed in the cooling chamber, the cooling fluid is easily heated by the heated liquid crystal panel and polarization plate, so that the heated cooling fluid is stayed in the cooling chamber.

Therefore, temperature difference between the optical modulator and the cooling fluid becomes small, which makes it difficult to cool the optical modulator efficiently.

An object of the present invention is to provide an optical device capable of efficiently cooling an optical modulator with a cooling fluid and a projector.

SUMMARY OF THE INVENTION

An optical device according to an aspect of the present invention includes a plurality of optical modulators that modulate a light beam irradiated from a light source in accordance with image information, the optical device including: a plurality of optical modulator holders respectively holding the plurality of optical modulators and respectively having cooling chambers with a cooling fluid sealed therein to respectively cool the plurality of optical modulators with the cooling fluid in the respective cooling chambers; and a plurality of fluid circulators intercommunicated with the plurality of optical modulator holders to guide the cooling fluid to the outside of the respective cooling chambers and to re-introduce the cooling fluid into the respective cooling chambers, in which a flow volume of the cooling fluid circulating in the respective optical modulator holders can be changed in accordance with heat values of the plurality of optical modulators.

For instance, a liquid crystal panel, a polarization plate and the like can be used as the optical modulator. When the liquid crystal panel, the polarization plate and the like are used as the optical modulator, the optical modulator holder may hold at least one of the components of the optical modulator.

In the present invention, since the plurality of optical modulator holders are intercommunicated with the plurality of fluid circulators, the cooling fluid can easily circulate inside and outside the cooing chambers, so that the cooling fluid heated by the optical modulator can be prevented from staying in the cooling chambers. Thus, the cooling fluid heated by the optical modulator does not cause to reduce the temperature difference between the optical modulator and the cooling fluid. Therefore, the optical modulator can be efficiently cooled with the cooling fluid, and the object of the present invention can be achieved.

The flow volume of the cooling fluid circulating in the respective optical modulator holders can be changed in accordance with heat values of the plurality of optical modulators. For instance, the flow volume of the cooling fluid for the optical modulator holder holding the optical modulator with high heat value can be set to large, while the flow volume of the cooling fluid for the optical modulator holder holding the optical modulator with low heat value can be set to small, so that the temperature of the respective optical modulators can be equalized. Thus, color of optical images formed by the respective optical modulators can be maintained properly.

It is preferable that the optical device according to the present invention further includes a flow volume changer disposed in a flow path of the cooling fluid and capable of changing the flow volume of the cooling fluid circulated in the respective optical modulator holders in accordance with the heat values of the plurality of optical modulators.

For instance, the flow volume changer may employ an arrangement in which a valve is provided in a flow path of the cooling fluid to narrow and widen the flow path by changing the position of the valve.

According to the present invention, for instance, the flow volume of the cooling fluid provided to the optical modulator holder holding the optical modulator with high heat value can be set to large, while the flow volume of the cooling fluid provided to the optical modulator holder holding the optical modulator with low heat value can be set to small by operating the flow volume changer. Thus, the temperature of the respective optical modulators can be equalized highly precisely with a simple arrangement.

In the optical device according to the present invention, it is preferable that the plurality of fluid circulators are so formed that sectional areas of the flow paths in the fluid circulators are different from each other in accordance with the heat values of the plurality of optical modulators.

According to the present invention, for instance, the sectional area of the flow path of the fluid circulator for circulating the cooling fluid for the optical modulator holder holding the optical modulator with high heat value is large, while the sectional area of the flow path of the fluid circulator for circulating the cooling fluid for the optical modulator holder holding the optical modulator with low heat value is small. Thereby, the temperature of the respective optical modulators can be easily equalized.

In the optical device according to the present invention, it is preferable that the plurality of fluid circulators include tubular members, tube diameters of which are different from each other in accordance with the heat values of the plurality of optical modulators.

According to the present invention, for instance, the tube diameter of the fluid circulator for circulating the cooling fluid for the optical modulator holder holding the optical modulator with high heat value is large, while the tube diameter of the fluid circulator for circulating the cooling fluid for the optical modulator holder holding the optical modulator with low heat value is small. Thereby, the temperature of the respective optical modulators can be easily equalized with a simple arrangement.

It is preferable that the optical device according to the present invention further includes a fluid pressure-feed section disposed in the flow paths of the cooling fluid in the plurality of fluid circulators and adapted to feed the cooling fluid to the respective optical modulator holders through the plurality of fluid circulators to forcibly circulate the cooling fluid.

According to the present invention, since the cooling fluid can be forcibly circulated by the pressure-feed section, the cooling fluid in the cooling chamber can be convected securely. Therefore, great temperature difference between the optical modulator and the cooling fluid can always be secured, so that cooling efficiency of the optical modulator can be enhanced.

In the optical device according to the present invention, it is preferable that the fluid pressure-feed section includes a plurality of fluid pressure-feed sections, and at least one of the plurality of fluid pressure-feed sections feeds the cooling fluid only to a predetermined optical modulator holder of the plurality of optical modulator holders through the plurality of fluid circulators.

According to the present invention, for instance, a pressure-feed section dedicated to feed the cooling fluid to a predetermined optical modulator holder holding the optical modulator with high heat value can be provided. Thus, the flow volume of the cooling fluid fed to the predetermined optical modulator holder holding the optical modulator with high heat value can be adjusted, so that the optical modulator with high heat value can be efficiently cooled. For instance, by arranging the flow volume of the cooling fluid fed by the dedicated pressure-feed section to be larger than that of the cooling fluid fed by the other pressure-feed sections, cooling efficiency of the optical modulator with high heat value can be further enhanced without providing the flow volume changer or changing the tube diameter of the fluid circulators or sectional area of the flow paths, and therefore, the respective optical modulators can be efficiently cooled.

With the above arrangement, the optical modulator with high heat value can be cooled, which is applicable to increased luminance and increased heat density resulted from downsizing, so that merchantability can be enhanced.

In the optical device according to the present invention, it is preferable that: the fluid pressure-feed section includes a plurality of fluid pressure-feed sections; at least any one of the plurality of fluid circulators connects a predetermined optical modulator holder of the plurality of optical modulator holders and at least one of the plurality of fluid pressure-feed sections to form a first flow path in which the cooling fluid can circulate; other fluid circulators of the plurality of fluid circulators connect other optical modulator holders excluding the predetermined optical modulator holder of the plurality of optical modulator holders and other fluid pressure-feed sections of the plurality of fluid pressure-feed sections to form a second flow path in which the cooling fluid can circulate; and the first flow path and the second flow path are independent of each other.

According to the present invention, for instance, the optical modulator with high heat value is cooled by the cooling fluid circulating in the first flow path, while the other optical modulators are cooled by the cooling fluid circulating in the second flow path. With such arrangement, since the first flow path and the second flow path are independent of each other, the respective optical modulators can function under proper temperature, so that the respective optical modulators can be efficiently cooled. Further, the respective optical modulators can function under proper temperature, so that the performance of the respective optical modulators can be maintained for a long period of time.

It is preferable that the optical device according to the present invention further includes: a temperature detector for detecting temperature of the cooling fluid for each of the plurality of optical modulators; and a controller for controllably driving the plurality of fluid pressure-feed sections to change the flow volume of the cooling fluid based on temperature information detected by the temperature detector.

According to the present invention, for instance, a target temperature for each of the optical modulators should be stored in the controller in advance to secure predetermined performance for the respective optical modulators. The controller compares the temperature detected by the temperature detector with the target temperature and controllably drives the respective pressure-feed sections to adjust the flow volume of the cooling fluid fed by the respective pressure-feed sections so that the temperature of the cooling fluid can be kept at the target temperature. With such arrangement, the respective optical modulators can be maintained around the target temperature, so that the performance of the respective optical modulators can be maintained for a long period of time. In the arrangement including the pressure-feed section dedicated to feed the cooling fluid to the predetermined optical modulator holder holding the optical modulator with high heat value as described above, for instance, since the controller controllably drives the dedicated pressure-feed section, the flow volume of the cooling fluid can be precisely adjusted for the optical modulator with high heat value.

A projector according to another aspect of the present invention includes: a light source device; the above-described optical device of the present invention; and a projection optical device for projecting an optical image formed by the optical device in an enlarged manner.

According to the present invention, since the projector includes the above-described optical device, the same functions and advantages as the above-described optical device can be obtained The projector including the above-described optical device can prevent thermal deterioration of the optical modulator, and thus life cycle of the projector can be extended.

By including the above-described optical device, the projector with its image quality hardly changed over time can be provided.

DETAILED DESCRIPTION OF PREFERRED EMBODIMENT(S)

First Exemplary Embodiment

A first exemplary embodiment of the present invention will be described below with reference to the attached drawings.

[1] Arrangement of Projector

Figure 1:
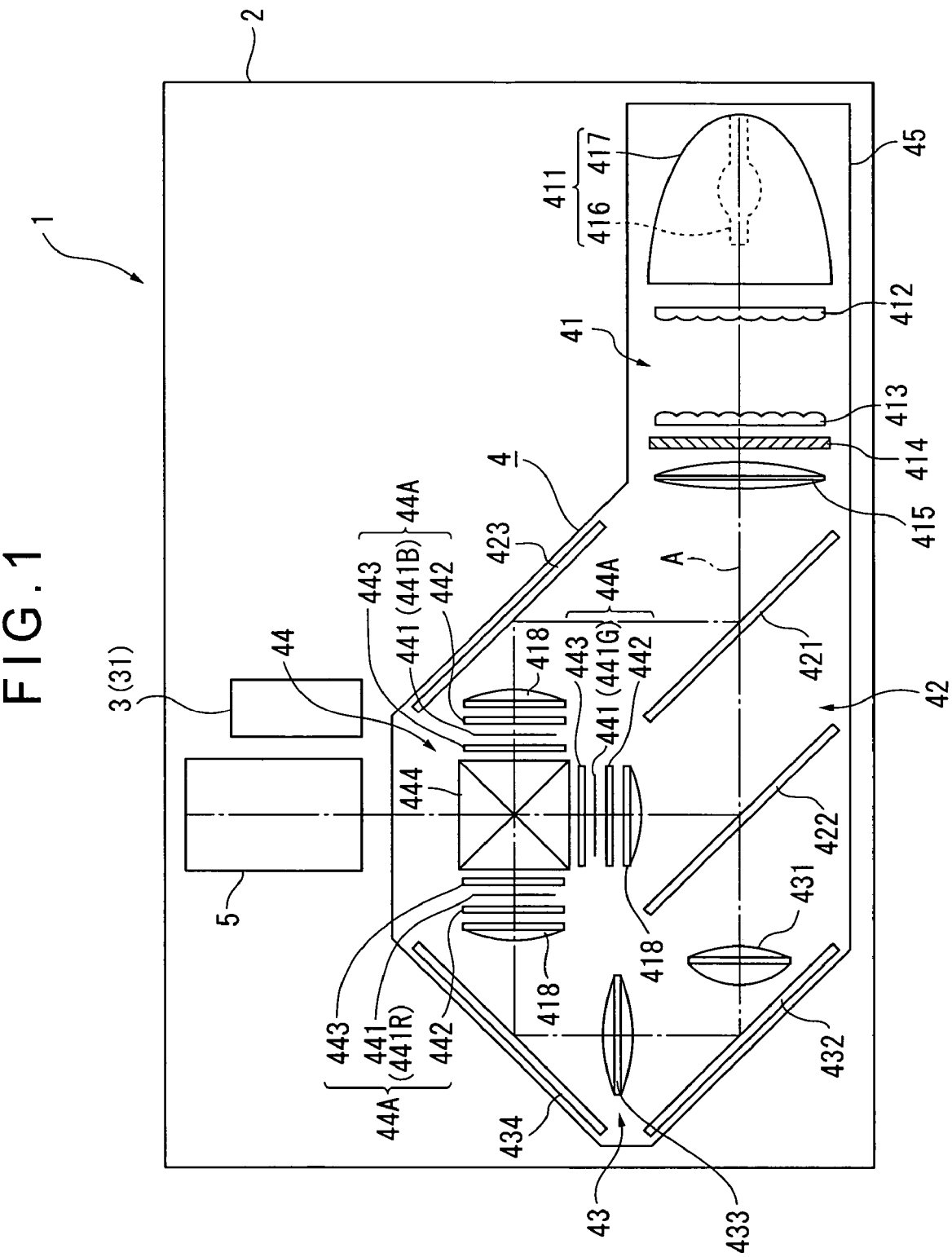
FIG. 1 is a schematic illustration showing the outline of a projector of a first exemplary embodiment.

FIG. 1 is a schematic illustration showing the outline of a projector 1.

The projector 1 modulates a light beam irradiated from a light source in accordance with image information to form a color image, and projects the formed color image on a screen in an enlarged manner. The projector 1 includes an exterior case 2, a cooling unit 3, an optical unit 4 and a projection lens 5 as a projection optical device.

In FIG. 1, although not shown, a power source block, a lamp driving circuit and the like are disposed in a space not occupied by the cooling unit 3, the optical unit 4 and the projection lens 5 in the exterior case 2.

The exterior case 2 is made of synthetic resin or the like, and formed in a substantially rectangular parallelepiped with the cooling unit 3, the optical unit 4 and the projection lens 5 housed and arranged therein. The exterior case 2, although not shown, is formed with an upper case constituting a top side, a front side, a rear side and lateral sides of the projector 1 and a lower case constituting a bottom side, a front side, lateral sides and a rear side of the projector 1. The upper case and the lower case are fixed to each other with screws or the like.

The exterior case 2 may not necessarily be made of synthetic resin, but other materials such as metals may be used.

Although not shown, the exterior case 2 is provided with an intake port for introducing the cooling air from outside of the projector 1 to the inside by the cooling unit 3 and an exhaust port for exhausting the air heated in the projector 1.

The cooling unit 3 sends the cooling air into a cooling path formed in the projector 1 for cooling the heat generated in the projector 1. The cooling unit 3 is located on a side of the projection lens 5, and provided with a sirocco fan 31 for introducing the cooling air from the outside of the projector 1 through the intake port (not shown) formed on the exterior case 2 to blow the cooling air against a later-described liquid crystal panel of an optical device of the optical unit 4.

Although not shown, the cooling unit 3 includes a cooling fan for cooling a later-described light source device of the optical unit 4, the not-shown power source block, lamp driving circuit and the like, in addition to the sirocco fan 31.

The optical unit 4 is a unit for optically processing the light beam irradiated from the light source to form an optical image (color image) in accordance with the image information. As shown in FIG. 1, the optical unit 4 has a substantially L-shape in plan view, extending along the rear side and along the lateral side of the exterior case 2. Incidentally, the detailed arrangement of the optical unit 4 will be described later.

The projection lens 5 is a lens set of combined plural lens. The projection lens 5 projects the color image formed by the optical unit 4 on a not-shown screen in an enlarged manner.

[Detailed Arrangement of Optical Unit]

As shown in FIG. 1, the optical unit 4 includes an integrator illumination optical system 41, a color-separating optical system 42, a relay optical system 43, an optical device 44 and an optical component casing 45 in which the optical components 41 to 44 are housed and arranged.

The integrator illumination optical system 41 is an optical system for substantially uniformly illuminating an image formation area of the later-described liquid crystal panel of the optical device 44. As shown in FIG. 1, the integrator illumination optical system 41 has a light source device 411, a first lens array 412, a second lens array 413, a polarization converter 414 and a superposing lens 415.

The light source device 411 has a light source lamp 416 irradiating a radial light beam and a reflector 417 for reflecting the radial light beam irradiated from the light source lamp 416. As the light source lamp 416, halogen lamp, metal halide lamp and high-pressure mercury lamp are often used. As the reflector 417, although a parabolic mirror is employed in FIG. 1, an ellipsoidal mirror provided with a parallelizing concave lens on the light-irradiation side thereof for parallelizing the light beam reflected by the ellipsoidal reflector may alternatively be employed.

The first lens array 412 has small lenses arranged in a matrix, the lenses having substantially rectangular profile as seen in an optical axis direction. Each of the small lenses separates the light beam irradiated from the light source device 411 into a plurality of sub-beams.

The second lens array 413 is arranged approximately in the same manner as the first lens array 412, which includes small lenses arranged in a matrix. The second lens array 413 focuses the image of the small lenses of the first lens array 412 onto the later-described liquid crystal panels of the optical device 44 together with the superposing lens 415.

The polarization converter 414 is disposed between the second lens array 413 and the superposing lens 415 to convert the light from the second lens array 413 into a substantially uniform polarized light.

Specifically, the respective sub-beams converted into the substantially uniform polarized light by the polarization converter 414 is substantially superposed on the later-described liquid crystal panels of the optical device 44 by the superposing lens 415 finally. Since only one-type of polarized light can be used in the projector using the liquid crystal panels that modulate polarized light, approximately half of the light beam from the light source device 411 emitting random polarized light cannot be used. Accordingly, with the use of the polarization converter 414, the light irradiated from the light source device 411 is converted into the substantially uniform polarized light to enhance the light utilization efficiency of the optical device 44.

As shown in FIG. 1, the color-separating optical system 42 has two dichroic mirrors 421 and 422, and a reflection mirror 423, and separates the plurality of sub-beams irradiated by the integrator illumination optical system 41 by the dichroic mirrors 421 and 422 into three color lights of red (R), green (G) and blue (B).

As shown in FIG. 1, the relay optical system 43 has an incident-side lens 431, a relay lens 433 and reflection mirrors 432 and 434, and guides red light separated by the color-separating optical system 42 to the liquid crystal panel for red light (described later) of the optical device 44.

At this time, the dichroic mirror 421 of the color-separating optical system 42 reflects a blue light component of the light beam irradiated by the integrator illumination optical system 41 and transmits a red light component and a green light component. The blue light reflected by the dichroic mirror 421 is reflected by the reflection mirror 423, which reaches to the liquid crystal panel for blue light (described later) of the optical device 44 through a field lens 418. The field lens 418 converts the respective sub-beams irradiated by the second lens array 413 into a light beam parallel to the central axis (main beam) thereof. The field lenses 418 provided on the light-incident side of other liquid crystal panels for green light and red light function in the same manner.

In the red and green lights transmitted through the dichroic mirror 421, the green light is reflected by the dichroic mirror 422, which reaches to the liquid crystal panel for green light (described later) of the optical device 44 through the field lens 418. On the other hand, the red light passes through the dichroic mirror 422, and further passes through the relay optical system 43 to reach the liquid crystal panel for red light (described later) of the optical device 44 through the field lens 418. Incidentally, the relay optical system 43 is used for the red light in order to avoid deterioration in the light utilization efficiency on account of light dispersion and the like caused by the longer length of the optical path of the red light than the optical paths of other color lights. In other words, the relay optical system 43 is used for directly transmitting the sub-beams incident on the incident-side lens 431 to the field lens 418.

As shown in FIG. 1, the optical device 44 includes three liquid crystal panels 441 (441R for red light, 441G for green light and 441B for blue light), incident-side polarization plates 442 and irradiation-side polarization plates 443 disposed on the light-incident side and the light-irradiation side of the liquid crystal panels 441, and a cross dichroic prism 444.

The three liquid crystal panels 441, the three irradiation-side polarization plates 443 and the cross dichroic prism 444 are integrated to form a later-described optical device body.

Although described later in detail, the optical device body includes a fluid circulator, a fluid branch section, an optical modulator holder and a support member in addition to the liquid crystal panels 441, the irradiation-side polarization plates 443, and the cross dichroic prism 444.

Although not shown in detail, the liquid crystal panel 441 is a pair of glass boards with a liquid crystal (electrooptic material) sealed therebetween, which modulates a polarization direction of a polarized light beam irradiated by the incident-side polarization plate 442 with orientation of the liquid crystal controlled in accordance with a drive signal output from a controller (not shown).

The respective color lights with their polarization direction aligned in substantially uniform direction by the polarization converter 414 are incident on the incident-side polarization plate 442. The incident-side polarization plate 442 is a reflective polarizer that only transmits the polarized light having substantially the same direction as a polarization axis of the light beam aligned by the polarization converter 414 and reflects the light beams having other polarization axes. For instance, as the incident-side polarization plate 442, there is an available reflective polarizer having a transmissive board made of glass or the like and a multi-layered film that is formed on the transmissive board and made by laminating many films of drawn polymer. The incident-side polarization plate 442 is not limited to the reflective polarizer including an organic material as described above. For instance, a reflective polarizer including an inorganic material may also be used, the reflective polarizer constituted with a transmissive board made of glass or the like and a conductive material such as metal formed on the transmissive board, in which a plurality of projected treads projected from the transmissive board and extended in an in-plane direction of the transmissive board are arrayed in a striped pattern.

Although described later in detail, the irradiation-side polarization plate 443 is formed with a reflective polarizer as with the incident-side polarization plate 442, the irradiation-side polarization plate 443 only transmitting the light beam having a polarization axis orthogonal to a transmission axis of the light beam at the incident-side polarization plate 442 among the light beams irradiated by the liquid crystal panel 441 and reflecting the light beam having other polarization axes.

The above-described incident-side polarization plate 442, liquid crystal panel 441 and irradiation-side polarization plate 443 constitute an optical modulator 44A which modulates the light beam to form a predetermined optical image.

The cross dichroic prism 444 is an optical element for combining the optical images irradiated by the respective optical modulators 44A for each color light to form a color image. The cross dichroic prism 444 has a square shape in plane view with four right-angle prisms attached with each other, and two dielectric multi-layered films are formed on the boundaries adhering the respective right-angle prisms. The dielectric multi-layered films reflect the color lights irradiated by the liquid crystal panels 441R and 441B and transmitted through the irradiation-side polarization plates 443, and transmit the color light irradiated by the liquid crystal panel 441G and transmitted through the irradiation-side polarization plate 443. The respective optical images formed by the respective optical modulators 44A are thereby combined to form the color image.

The optical component casing 45 is made of, for instance, a heat conductive material such as metal, in which a predetermined illumination optical axis Ax is set, so that the above-described optical components 41 to 44 are housed and arranged at predetermined positions relative to the illumination optical axis Ax and the projection lens is then positioned at a predetermined position relative to the optical device 44 as shown in FIG. 1. Although not shown in detail, the optical component casing 45 includes a container-like component housing member for housing the optical components 41 to 44 and a lid (not shown) closing an opening of the component housing member.

The component housing member respectively constitutes a bottom side, a front side and lateral sides of the optical component casing 45, and grooves for slidably fitting the above-described optical components 412 to 415, 418, 421 to 423, 431 to 434 and 442 from the upper side is formed on the inner wall of the lateral sides. Three holes 451 (FIG. 8) are formed on the bottom side, corresponding to a position of the liquid crystal panels 441 of the optical device 44, so that the cooling air discharged from the sirocco fan 31 included in the cooling unit 3 is guided to the three holes 451 through a duct (not shown) and then blown against the respective liquid crystal panels 441 through the three holes 451.

[Arrangement of Optical Device Body]

Figure 2:
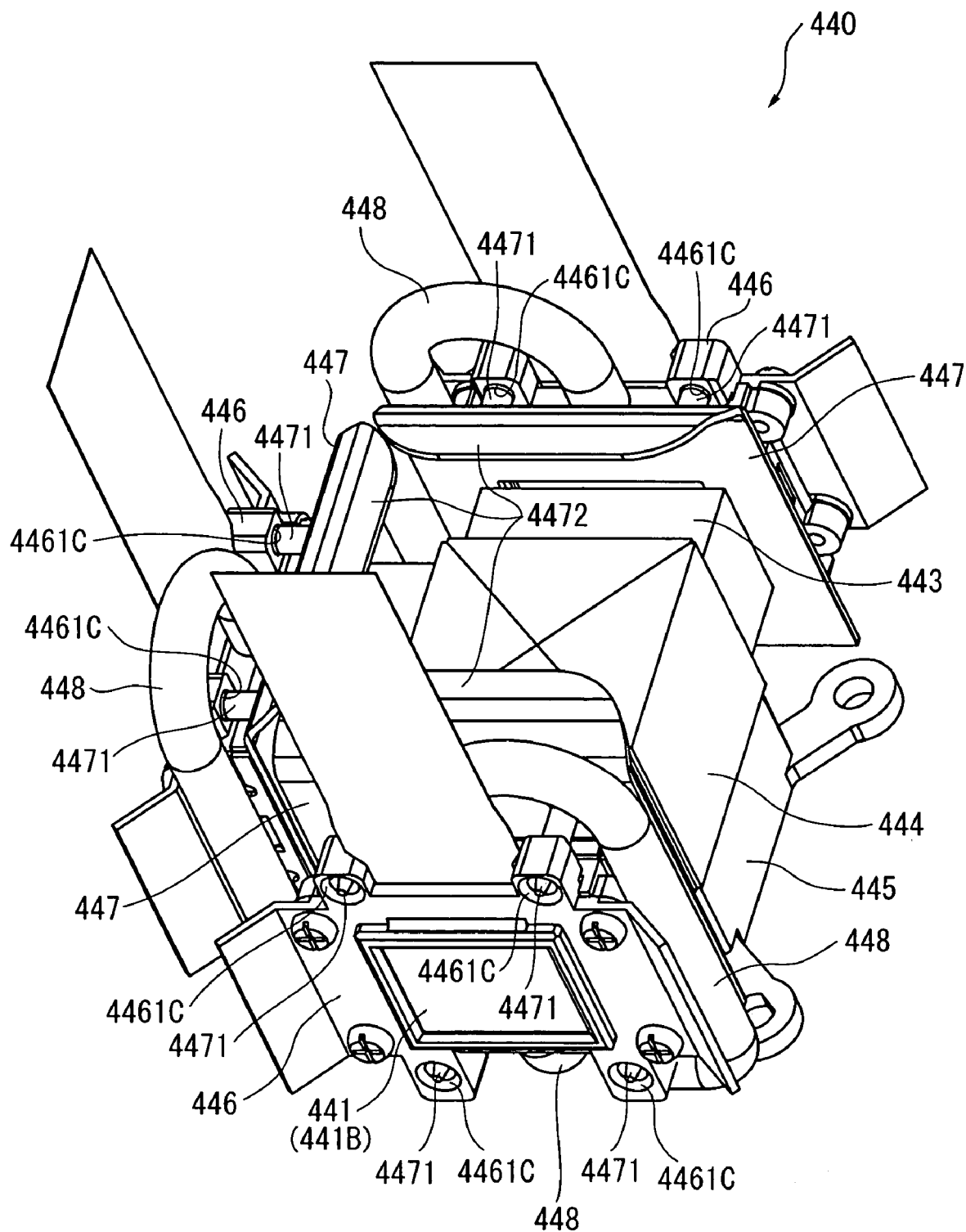
FIG. 2 is a perspective view showing an upper side of an optical device body of the aforesaid exemplary embodiment.

FIG. 2 is a perspective view showing an upper side of the optical device body 440.

Figure 3:
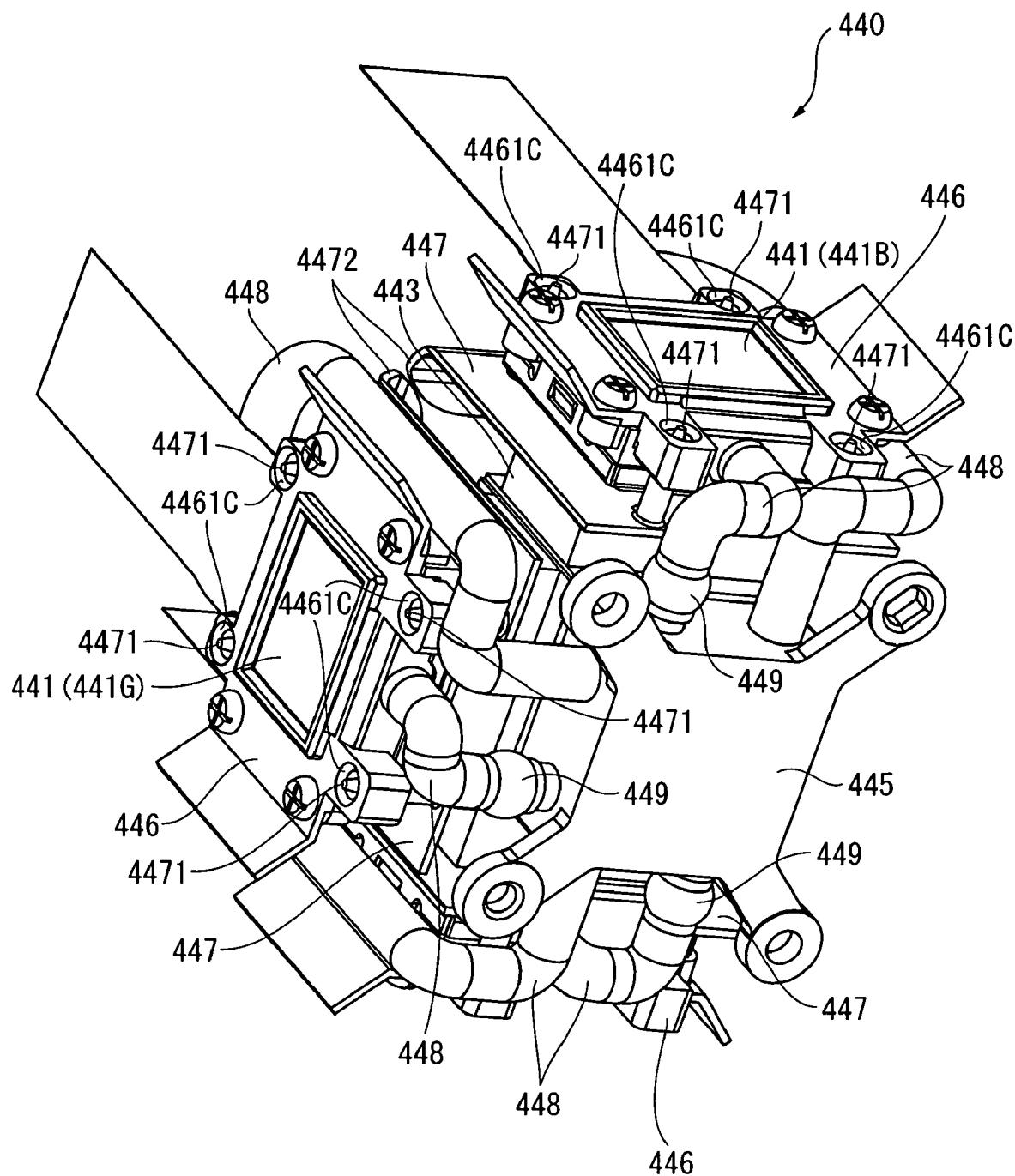
FIG. 3 is a perspective view showing a lower side of the optical device body of the aforesaid exemplary embodiment.

FIG. 3 is a perspective view showing a lower side of the optical device body 440.

As shown in FIG. 2 or 3, the optical device body 440 includes the three liquid crystal panels 441, the three irradiation-side polarization plates 443, the cross dichroic prism 444 (FIG. 2), a fluid branch section 445, three optical modulator holders 446, three support members 447, and a plurality of fluid circulators 448.

[Arrangement of Fluid Circulator]

The plurality of fluid circulators 448 are aluminum tubular members in which the cooling fluid can convect, the fluid circulators 448 connecting the fluid branch section 445 and the optical modulator holder 446 such that the cooling fluid can circulate. The circulating cooling fluid cools heat generated at the liquid crystal panel 441.

In the present exemplary embodiment, ethylene glycol being a transparent nonvolatile liquid is used as the cooling fluid. As the cooling fluid, without limiting to ethylene glycol, other liquids such as, for instance, the one prepared by diluting ethylene glycol with water and further adding antifoaming agent containing silicone oil may be used. With the use of such cooling fluid, heat quantity required to raise the temperature of the cooling fluid increases, which enhances heat absorption capability. Further, since generation of foams can be prevented, influence on the projected image caused by the foams can be reduced.

Same cooling effect can be obtained with the cooling fluid prepared by diluting propylene glycol with water.

[Arrangement of Irradiation-Side Polarization Plate]

Figure 4:
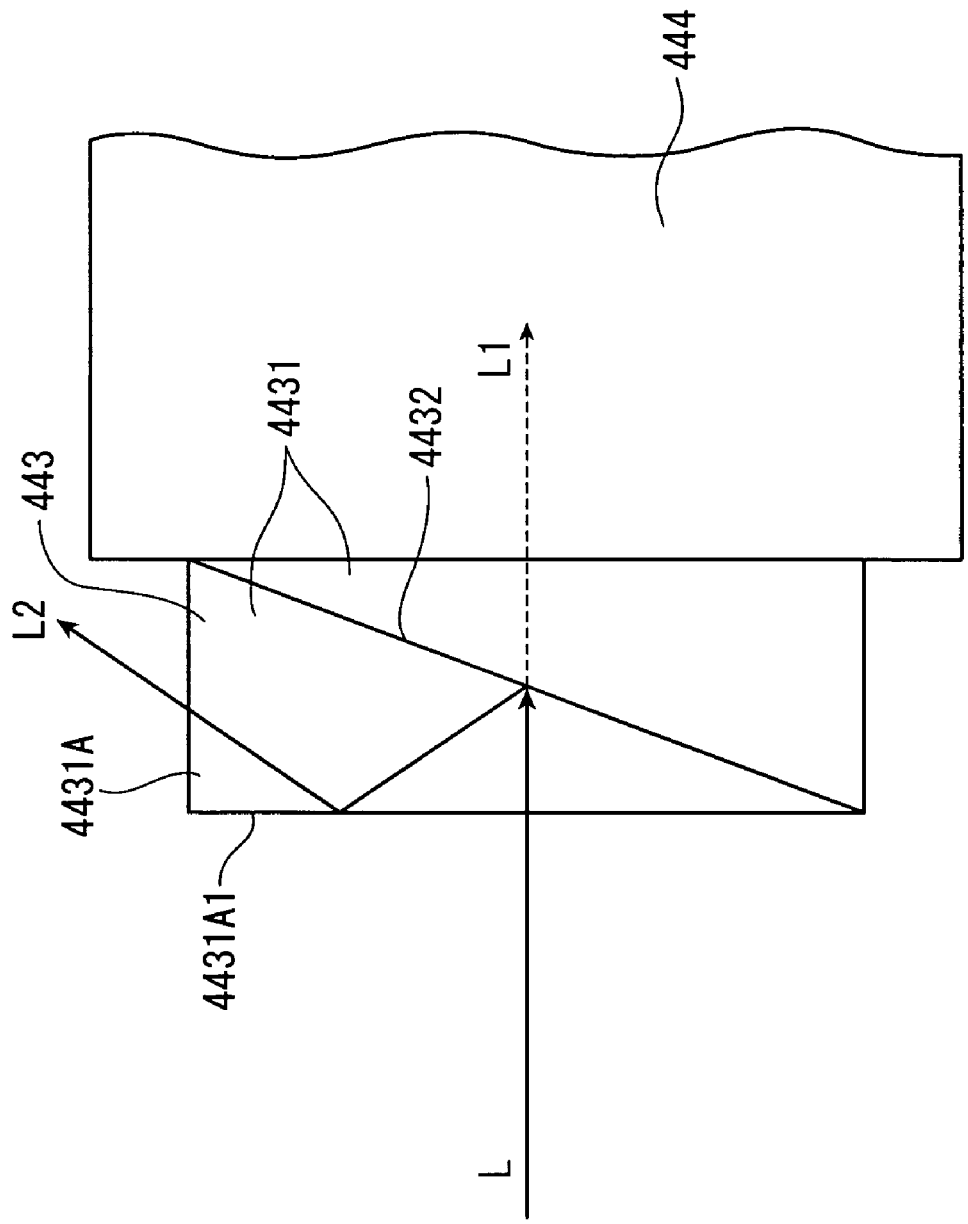
FIG. 4 is a schematic illustration showing the arrangement of an irradiation-side polarization plate of the aforesaid exemplary embodiment.

FIG. 4 is a schematic illustration showing the arrangement of the irradiation-side polarization plate 443. Specifically, FIG. 4 is a side view showing the irradiation-side polarization plate 443.

As shown in FIG. 4, the three irradiation-side polarization plates 443 are respectively adhered and fixed to the respective light-incident sides of the cross dichroic prism 444.

As shown in FIG. 4, the irradiation-side polarization plate 443 includes two right-angle prisms 4431 and a reflective polarization film 4432 formed on an interface of the right-angle prisms 4431.

In the two right-angle prisms 4431, an incident-side prism 4431A disposed on the light-incident side has an incident-side face 4431 A1 serving concurrently as a transmissive surface for the light beam irradiated by the liquid crystal panel 441 and a total reflection surface for the light beam reflected by the reflective polarization film 4432.

The reflective polarization film 4432 is, for instance, a multi-layered film made by laminating many films of drawn polymer.

As shown in FIG. 4, among light beams L incident on the irradiation-side polarization plate 443, a light beam L1 having a predetermined polarization axis is transmitted through the reflective polarization film 4432 to be incident on the cross dichroic prism 444.

As shown in FIG. 4, among the light beams L incident on the irradiation-side polarization plate 443, light beams L2 having other polarization axes are reflected by the reflective polarization film 4432, and further, totally reflected by the incident-side face 4431 A1 of the incident-side prism 4431A to be irradiated to the upper side.

[Arrangement of Branch Section]

Figure 5A:
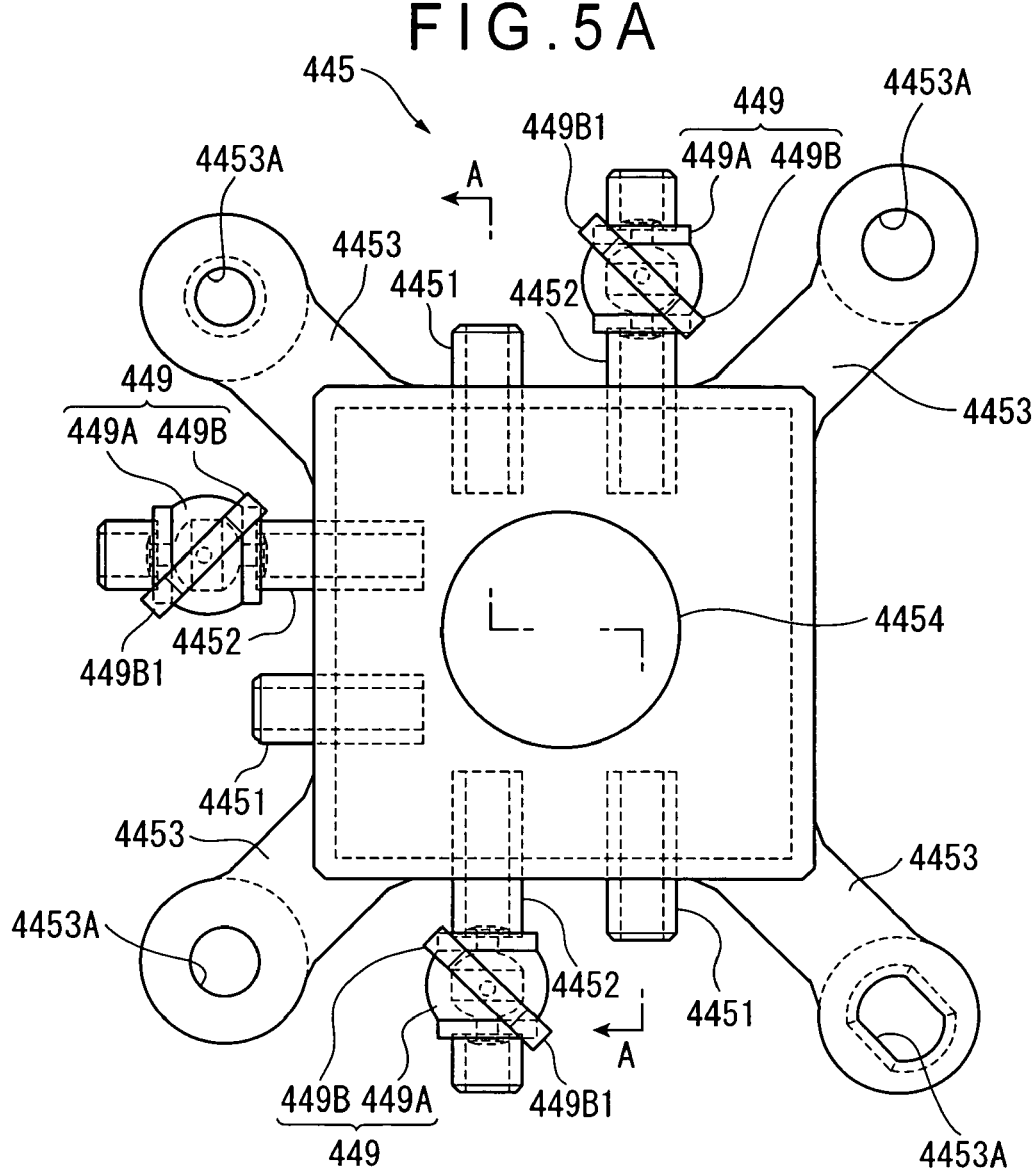
FIG. 5A is a plan view showing the arrangement of a fluid branch section of the aforesaid exemplary embodiment.
Figure 5B:
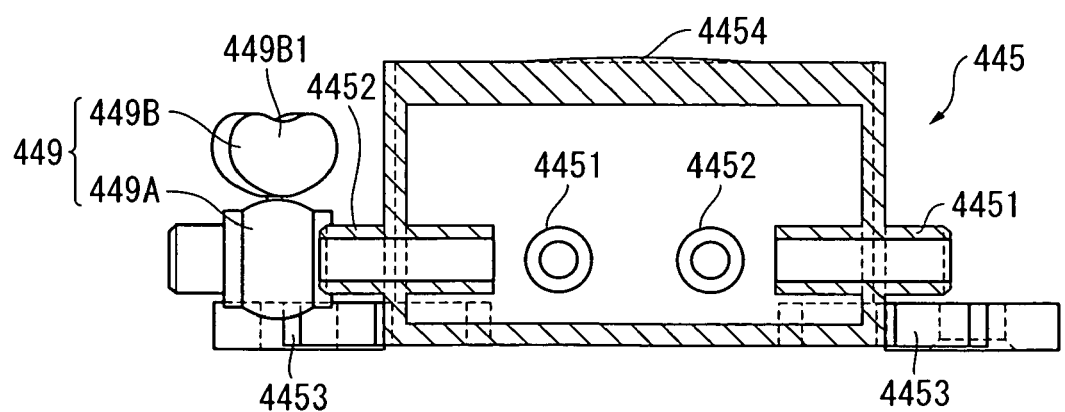
FIG. 5B is a side view showing the arrangement of the fluid branch section of the aforesaid exemplary embodiment.

FIGS. 5A and 5B are illustrations each showing the arrangement of the fluid branch section 445. Specifically, FIG. 5A is a plan view showing an upper side of the fluid branch section 445. FIG. 5B is a cross section taken along line A-A in FIG. 5A.

The fluid branch section 445 is an aluminum hollow member having a substantially rectangular parallelepiped shape, which temporarily stores the cooling fluid therein. The fluid branch section 445 introduces the cooling fluid discharged from the three optical modulator holders 446 to the inside and branches and sends out the cooling fluid stored therein to the three optical modulator holders 446. The fluid branch section 445 is fixed to the bottom side being orthogonal to three light-incident sides of the cross dichroic prism 444, the fluid branch section 445 functioning as a prism fixing plate for supporting the cross dichroic prism 444.

As shown in FIGS. 5A and 5B, three sides of the fluid branch section 445 corresponding to the respective light-incident sides of the cross dichroic prism 444 are respectively provided with cooling fluid inflow sections 4451 for introducing the cooling fluid discharged from the respective optical modulator holders 446 to the inside and cooling fluid outflow sections 4452 for branching and discharging the internal cooling fluid to the three optical modulator holders 446.

The cooling fluid inflow section 4451 and the cooling fluid outflow section 4452 are substantially cylindrical members having tube diameter smaller than the tube diameter of the fluid circulator 448, which project toward inside and outside of the fluid branch section 445. Outwardly-projecting ends of the cooling fluid inflow section 4451 and the cooling fluid outflow section 4452 are respectively connected to an end of the fluid circulators 448, and the cooling fluid is introduced and discharged through the fluid circulators 448.

As shown in FIGS. 5A and 5B, in the cooling fluid inflow sections 4451 and the cooling fluid outflow sections 4452, the cooling fluid outflow sections 4452 are respectively provided with flow volume changers 449.

The volume changers 449 can change flow volume of the cooling fluid sent from the respective cooling fluid outflow sections 4452 to the respective optical modulator holders 446. As shown in FIGS. 5A and 5B, the volume changer 449 includes a flow volume changer body 449A and a flow volume adjuster 449B.

The volume changer body 449A is provided with a flow path in which the cooling fluid can circulate while rotatably supporting the volume adjuster 449B.

The volume adjuster 449B includes an adjusting valve (not shown) disposed in the volume changer body 449A and an adjusting screw 449B1 protruding toward the outside of the volume changer body 449A.

The adjusting valve can change flow volume of the cooling fluid flowing in the flow path by widening and narrowing the flow path in the volume changer body 449A in accordance with a rotating position. The adjusting valve interlocks with a motion of the adjusting screws 449B1, so that the flow volume of the cooling fluid flowing in the flow path of the volume changer body 449A can be changed by manually rotating the adjusting screw 449B1.

Figure 8:
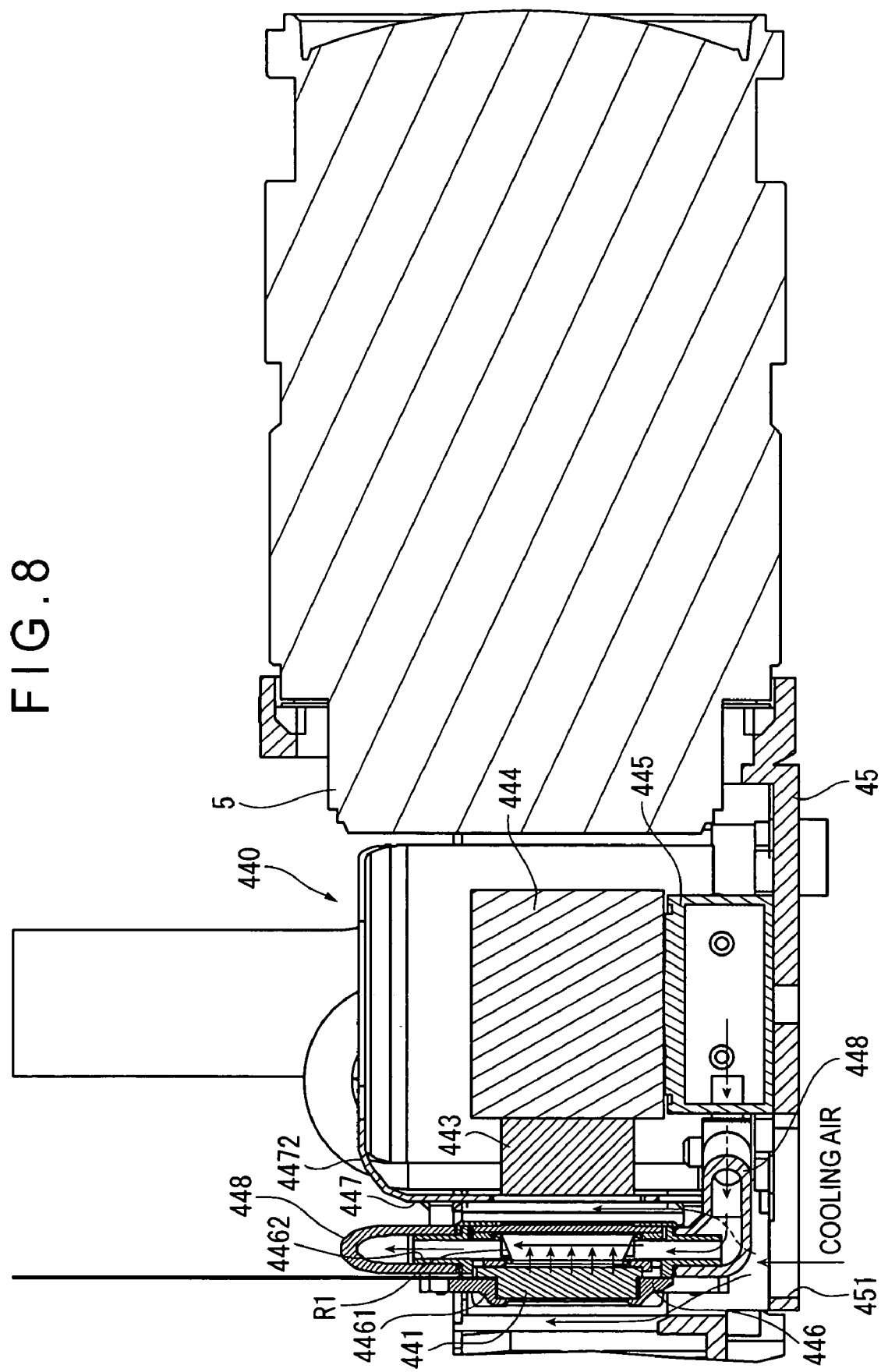
FIG. 8 is an illustration showing how a liquid crystal panel of the aforesaid exemplary embodiment is cooled.

As shown in FIG. 5A, four corners of the bottom side of the fluid branch section 445 are respectively provided with arms 4453 extending along the bottom side. Holes 4453A are respectively formed at the tip ends of the arms 4453. By inserting screws (not shown) into the holes 4453A and screwing the screws into the bottom side of the optical component casing 45, the optical device body 440 is fixed to the optical component casing 45 (FIG. 8). At this time, the fluid branch section 445 and the optical component casing 45 are heat-transferably connected to each other.

In the fluid branch section 445, as shown in FIGS. 5A and 5B, a spherical bulged section 4454 is formed substantially at the center of the upper side. By attaching the bulged section 4454 to the bottom side of the cross dichroic prism 444, the position of the cross dichroic prism 444 in tilting direction can be adjusted relative to the fluid branch section 445.

[Arrangement of Optical Modulator Holder]

Figure 6:
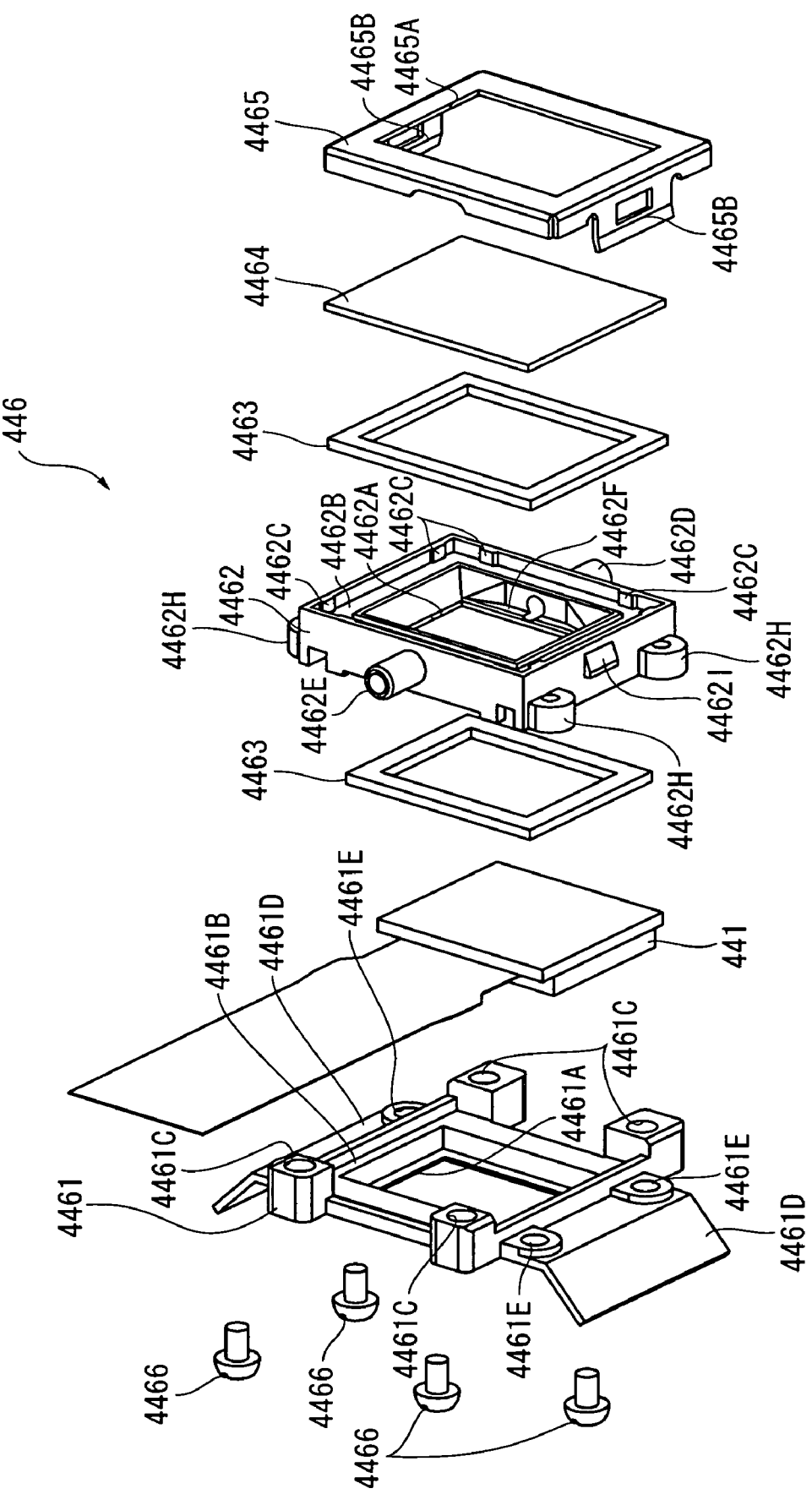
FIG. 6 is an exploded perspective view showing the outline of an optical modulator holder of the aforesaid exemplary embodiment.

FIG. 6 is an exploded perspective view showing the outline of the optical modulator holder 446.

The three optical modulator holders 446 respectively hold the three liquid crystal panels 441 respectively included in the three optical modulators 44A while respectively cooling the three liquid crystal panels 441 with the cooling fluid introduced to and discharged from the inside. Each of the optical modulator holders 446 has the same arrangement, and thus only one of the optical modulator holders 446 will be described below.

As shown in FIG. 6, the optical modulator holder 446 includes a pair of frame members 4461 and 4462, two elastic members 4463, a transmissive board 4464 and a transmissive board fixture 4465.

The frame member 4461 is an aluminum member having a substantially rectangular shape in plan view with a rectangular opening 4461A substantially at the center thereof corresponding to an image formation area of the liquid crystal panel 441. The frame member 4461 is disposed on the light-incident side relative to the frame member 4462, which presses and fixes the liquid crystal panel 441 to the frame member 4462 from the light-incident side with the elastic member 4463 interposed therebetween.

As shown in FIG. 6, a supporting side 4461B for supporting the light-irradiation side (translator's comment: light-incident side) of the liquid crystal panel 441 is formed on the light-irradiation side of the frame member 4461.

As shown in FIG. 6, four holes 4461C for later-described pins of the support members 447 to be inserted are formed at upper corners and lower corners of the frame member 4461.

As shown in FIG. 6, fins 4461D are formed on right and left end faces of the frame member 4461 so as to protrude in a direction substantially orthogonal to the right and left end faces while extending and bending toward the light-incident side.

The fins 4461D releases heat transferred from the cooling fluid to the frame member 4462 by heat exchange with the external air.

Further, as shown in FIG. 6, connecting sections 4461E to be connected to the frame member 4462 are formed at upper and lower ends of base ends of the fins 4461D.

Figure 7:
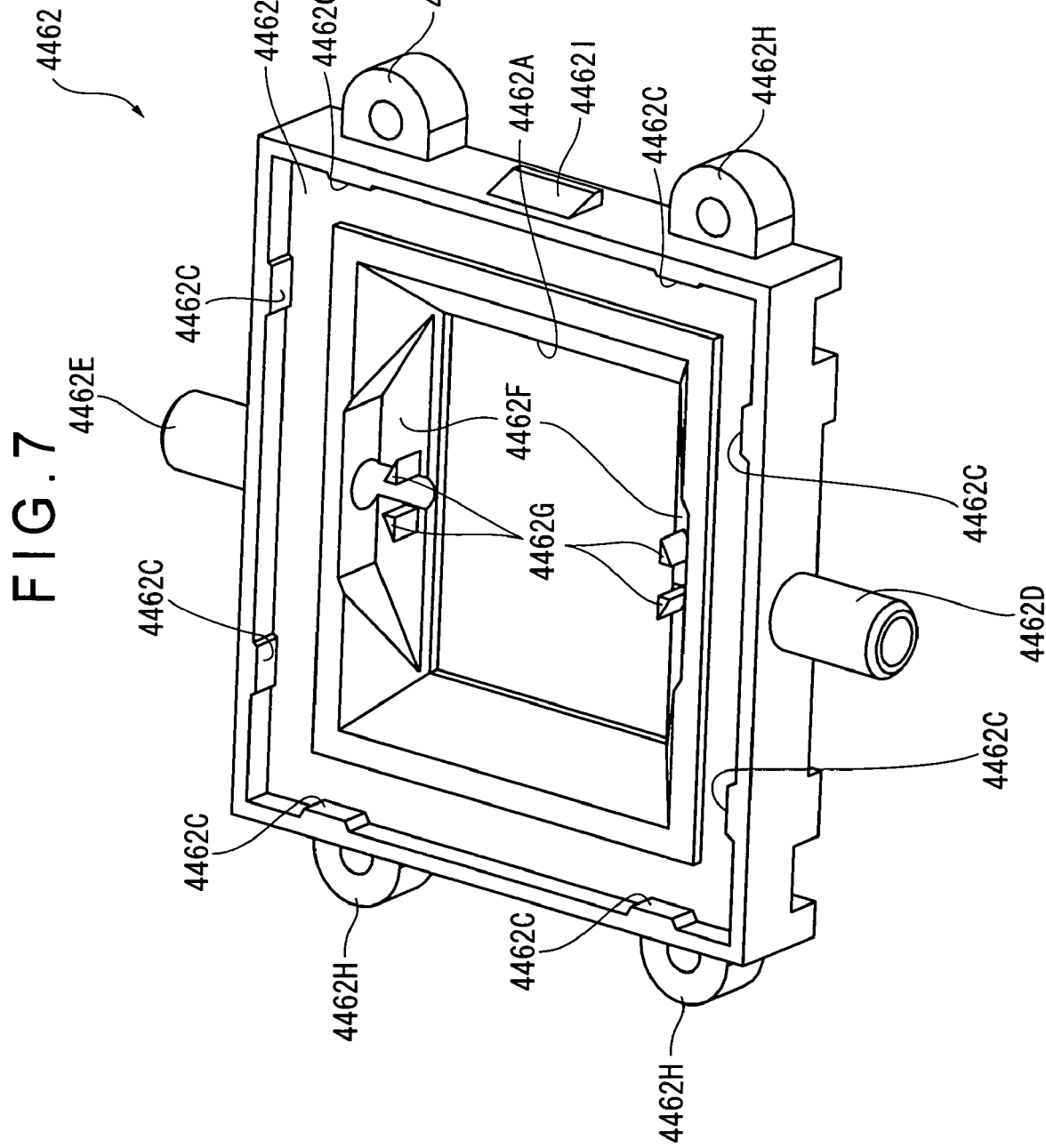
FIG. 7 is a perspective view showing a frame member of the aforesaid exemplary embodiment viewed from the light-irradiation side.

FIG. 7 is a perspective view showing the frame member 4462 viewed from the light-irradiation side.

The frame member 4462 is an aluminum frame having a substantially rectangular shape in plan view with a rectangular opening 4462A substantially at the center thereof corresponding to the image formation area of the liquid crystal panel 441. The frame member 4462 sandwiches the liquid crystal panel 441 with the frame member 4461 with the elastic member 4463 interposed therebetween, while supporting the transmissive board 4464 at a side opposite to an opposing side to the frame member 4461 with the elastic member 4463 interposed therebetween.

As shown in FIG. 7, a cavity 4462B having a rectangular frame shape corresponding to the shape of the elastic member 4463 is formed on the light-irradiation side of the frame member 4462, so that the transmissive board 4464 is supported by the cavity 4462B with the elastic member 4463 interposed therebetween. Since the frame member 4462 supports the transmissive board 4464, the light-irradiation side of the opening 4462A is closed with the elastic member 4463 and the light-incident side of transmissive board 4464. On an outer circumferential edge of the cavity 4462B, a plurality of engaging projections 4462C are formed. The engaging projections 4462C contact with the outer side of the elastic member 4463 to position and set the elastic member 4463 in the cavity 4462B.

Although not shown, a cavity same as the cavity 4462B formed on the light-irradiation side is also formed on the light-incident side of the frame member 4462, so that the light-irradiation side of the liquid crystal panel 441 is supported by the cavity with the elastic member 4463 interposed therebetween. Since the frame member 4462 supports the light-irradiation side of the liquid crystal panel 441, the light-incident side of the opening 4462A is closed with the elastic member 4463 and the light-irradiation side of the liquid crystal panel 441. Although not shown, engaging projections same as the engaging projections 4462C formed on the light-irradiation side are also formed on the light-incident side.

When the light-incident side and the light-irradiation side of the opening 4462A are closed with the liquid crystal panel 441 and the transmissive board 4464 as described above, a cooling chamber R1 (FIG. 8) is formed such that the cooling fluid can be sealed in the frame member 4462.

As shown in FIG. 7, an inflow port 4462D for introducing the cooling fluid discharged from the cooling fluid outflow section 4452 of the fluid branch section 445 to the inside is formed substantially at the center of the lower side of the frame member 4462. The inflow port 4462D is a substantially cylindrical member having tube diameter smaller than that of the fluid circulator 448, which is so formed to project toward outside of the frame member 4462. The projecting end of the inflow port 4462D is connected to an end of the fluid circulator 448 being connected to the cooling fluid outflow section 4452 of the fluid branch section 445, so that the cooling fluid discharged from the fluid branch section 445 is introduced into the cooling chamber R1 (FIG. 8) of the frame member 4462 through the fluid circulator 448.

As shown in FIG. 7, an outflow port 4462E for discharging the cooling fluid in the cooling chamber R1 (FIG. 8) of the frame member 4462 to the outside is formed substantially at the center of the upper side of the frame member 4462. In other words, the outflow port 4462E is formed at a position opposing the inflow port 4462D. The outflow port 4462E, as with the inflow port 4462D, is a substantially cylindrical member having tube diameter smaller than that of the fluid circulator 448, which is so formed to project toward outside of the frame member 4462. The projecting end of the outflow port 4462E is connected to an end of the fluid circulator 448 being connected to the cooling fluid inflow section 4451 of the fluid branch section 445, so that the cooling fluid in the cooling chamber R1 (FIG. 8) is introduced into the fluid branch section 445 through the fluid circulator 448.

As shown in FIG. 7, on the periphery of the opening 4462A, concave sections 4462F dented toward the light-incident side are formed around the portions communicating with the inflow port 4462D and the outflow port 4462E, the outer side of the concave sections 4462F being narrowed toward the portions.

Two rectifying section 4462G are formed on the bottom side of the concave section 4462F. These rectifying sections 4462G have a substantially right triangle cross section, which are disposed with a predetermined space therebetween with the oblique line of each right triangle extended in a direction away from the portion.

Further, as shown in FIG. 7, connecting sections 4462H to be connected to the frame member 4461 are formed at right end corners and left end corners of the frame member 4462.

By screwing screws 4466 (FIG. 6) into the respective connecting sections 4461E and 4462H of the frame members 4461 and 4462, the liquid crystal panel 441 is sandwiched between the frame members 4461 and 4462 with the elastic member 4463 interposed therebetween, so that the light-incident side of the opening 4462A of the frame member 4462 is sealed.

Further, as shown in FIGS. 6 and 7, hooks 44621 for the transmissive board fixtures 4465 to be engaged are formed substantially at the center of left and right ends of the frame member 4462.

The elastic members 4463 are respectively interposed between the liquid crystal panel 441 and the frame member 4462 and between the frame member 4462 and the transmissive board 4464 for sealing the cooling chamber R1 (FIG. 8) of the frame member 4462 to prevent leakage of the cooling fluid. The elastic member 4463 is made of a silicone rubber having elasticity, in which surface treatment for enhancing crosslinking density of surface layers is provided to both sides or one side. For example, as the elastic member 4463, SARCON GR-d series (trademark of Fuji Polymer Industries Co., Ltd.) can be employed. Due to the surface treatment provided to the side, the elastic members 4463 can be easily set in the respective cavities 4462B of the frame member 4462.

As the elastic members 4463, butyl rubber, fluorocarbon rubber or the like having low moisture permeability may also be employed.

The transmissive board 4464 is made of transmissive materials such as, for instance, glass board.

The transmissive board fixture 4465 presses and fixes the transmissive board 4464 to the cavity 4462B of the frame member 4462 with the elastic member 4463 interposed therebetween. The transmissive board fixture 4465 is a frame having a substantially rectangular shape in plan view with an opening 4465A substantially at the center thereof, which presses the transmissive board 4464 to the frame member 4462 around an edge of the opening 4465A. Hook engaging sections 4465B are respectively formed on the right and left side edges of the transmissive board fixture 4465. By engaging the hooks 44621 of the frame member 4462 with the hook engaging sections 4465B, the transmissive board fixture 4465 presses and fixes the transmissive board 4464 to the frame member 4462.

[Arrangement of Support Member]

The support member 447 is a plate having a rectangular frame shape in plan view with an opening (not shown) substantially at the center thereof, which supports the optical modulator holder 446 to integrate the optical modulator holder 446 and the cross dichroic prism 444. The support member 447, for instance, may be made of aluminum with its surface coated with anodized black-aluminum. The support member 447 may be made of a ferrous material having heat expansion coefficient substantially intermediate between an aluminum as a material of the optical modulator holder 446 and a material of the cross dichroic prism 444.

As shown in FIG. 2 or 3, pins 4471 projecting from the plate are formed at positions corresponding to the four holes 4461C of the optical modulator holder 446 on the light-incident side of the support member 447.

As shown in FIG. 2 or 3, the support member 447 has a curved section 4472 curving toward the light-irradiation side at the upper edge.

The support member 447 supports the optical modulator holder 446 by inserting the pins 4471 into the four holes 4461C of the optical modulator holder 446, and the optical modulator holder 446 is integrated with the cross dichroic prism 444 by adhering and fixing the light-irradiation side of the plate to the light-incident side of the irradiation-side polarization plate 443 being fixed to the cross dichroic prism 444.

By fixing the optical modulator holder 446 to the cross dichroic prism 444, the curved section 4472 of the support member 447 is disposed so as to cover the upper side of the light-irradiation side polarization plate 443 (FIG. 8), so that the light beam L2 (FIG. 4) irradiated toward the upper side through the irradiation-side polarization plate 443 is shielded.

As described above, in the optical device body 440, the cooling fluid circulates in the flow path from the fluid branch section 445 to the optical modulator holder 446 and back to the fluid branch section 445 through the plurality of fluid circulators 448 by natural convection.

[Cooling Mechanism]

Next, cooling mechanism of the liquid crystal panel 441 will be described below.

FIG. 8 is a cross section showing how the liquid crystal panel 441 is cooled.

The heat generated at the liquid crystal panel 441 by the light beam irradiated from the light source device 411 is transferred to the cooling fluid in the cooling chamber R1 of the frame member 4462 of the optical modulator holder 446.

When the heat is transferred to the cooling fluid in the cooling chamber R1, temperature difference is generated between the cooling fluid in the cooing chamber R1 and the cooling fluid in other parts, which results in generation of the natural convection in the flow path of the cooling fluid in the optical device body 440.

The heat transferred to the cooling fluid in the cooling chamber R1 transfers from the cooling chamber R1 to the fluid branch section 445 with the flow of the cooling fluid. When the heated cooling fluid is introduced into the fluid branch section 445, the heat of the cooling fluid is released through a heat transfer path from the fluid branch section 445 to the optical component casing 45. The cooled cooling fluid again moves from the fluid branch section 445 to the cooling chamber R1. At this time, flow volume of the cooling fluid introduced into the three cooling chambers R1 are different due to the volume changer 449 disposed in the fluid branch section 445. In the present exemplary embodiment, by operating the respective adjusting screws 449B1 in the respective volume changer 449, the flow volume of the cooling fluid introduced into the cooling chamber R1 of the optical modulator holder 446 holding the liquid crystal panel 441G with high heat value is largest, and the flow volume of the cooling fluid introduced into the cooling chamber R1 of the optical modulator holder 446 holding the liquid crystal panel 441B and the flow volume of the cooling fluid introduced into the cooling chamber R1 of the optical modulator holder 446 holding the liquid crystal panel 441R are smaller in order of mention.

The heat transferred to the cooling fluid in the cooling chamber R1 is further transferred to the frame member 4461 and to the fin 4461D (FIG. 6) of the frame member 4461.

The cooling air introduced from the outside of the projector 1 to the inside thereof by the sirocco fan 31 (FIG. 1) of the cooling unit 3 is introduced into the optical component casing 45 through the holes 451 provided at the bottom side of the optical component casing 45. As shown in FIG. 8, the cooling air introduced into the optical component casing 45 circulates from the lower side toward the upper side along the outer side of the optical modulator holder 446. At this time, the cooling air cools the heat transferred to the fin 4461D (FIG. 6) of the frame member 4461 while cooling the light-incident side of the liquid crystal panel 441.

In the first exemplary embodiment described above, since the optical device body 440 has an arrangement in which the inflow ports 4462D and the outflow ports 4462E of the respective optical modulator holders 446 are intercommunicated with the plurality of fluid circulators 448, the cooling fluid can be easily convected from/to the inside/outside of the respective cooling chambers R1, so that the cooling fluid heated by the respective liquid crystal panels 441 can be prevented from staying in the respective cooling chambers R1. Therefore, even when the cooling fluid heated at the liquid crystal panel 441 does not reduce temperature difference between the cooling fluid and the liquid crystal panel 441, so that the liquid crystal panel 441 can be efficiently cooled by the cooling fluid.

Since the optical modulator holder 446 closes the light-incident side of the opening 4462A of the frame member 4462 with the liquid crystal panel 441, the cooling fluid directly contacts with the liquid crystal panel 441, which further enhances the cooling efficiency for cooling the liquid crystal panel 441 with the cooling fluid.

The incident-side polarization plate 442 and the irradiation-side polarization plate 443 are formed with the reflective polarizer. Thus, compared with the absorptive polarizer that absorbs the light beams having polarization axes other than a predetermined polarization axis, the heat is hardly generated, so that the temperatures of the incident-side polarization plate 442 and the irradiation-side polarization plate 443 can be kept at low. Thus, unlike the conventional manner, the polarizer does not have to be cooled by the cooling fluid while being held by the optical modulator holder, and further, the temperature of the cooling fluid in the cooling chamber R1 of the optical modulator holder 446 is not raised by the incident-side polarization plate 442 and the irradiation-side polarization plate 443. Therefore, the liquid crystal panel 441 can be efficiently cooled by the cooling fluid.

Accordingly, thermal deterioration due to the temperature rise of the optical modulator 44A including the incident-side polarization plate 442, the liquid crystal panel 441 and the irradiation-side polarization plate 443 can be prevented, so that a proper optical image can be formed by the optical modulator 44A.

Since the optical device body 440 has the fluid branch section 445, the cooling fluid can be sealed in not only the respective cooling chambers R1 and the plurality of fluid circulators 448 but also the fluid branch section 445 to increase content of the cooling fluid, which enhances heat exchange capacity between the liquid crystal panel 441 and the cooling fluid.

Further, the optical device body 440 has the volume changer 449. Thus, by operating the adjusting screws 449B1, the cooling fluid can be supplied to the optical modulator holder 446 holding the liquid crystal panel 441G with the high heat value with large flow volume, while the cooling fluid can be supplied to the optical modulator holders 446 holding the other liquid crystal panels 441R and 441B with small flow volume. Therefore, the temperature of the respective liquid crystal panels 441 can be easily and highly precisely equalized with a simple arrangement. Accordingly, color of the respective optical image formed by the respective optical modulators 44A can be maintained properly.

The projector 1 having the optical device body 440 can prevent thermal deterioration of the optical modulator 44A, so that life cycle of the projector 1 can be extended.

By including the optical device body 440 described above, the projector 1 with its image quality hardly changed over time can be provided.

Second Exemplary Embodiment

A second exemplary embodiment of the present invention will be described below with reference to the attached drawings.

In the following description, the same components as those in the first exemplary embodiment are indicated by the same reference symbols or numerals for omitting or simplifying the detailed description thereof.

In the above first exemplary embodiment, the optical device body 440 includes the three volume changers 449 capable of changing the flow volumes of the cooling fluid introduced into the respective optical modulator holders 446. By operating the respective adjusting screws 449B1 of the respective volume changers 449, the flow volume of the cooling fluid introduced into the respective cooling chambers R1 can be changed.

On the other hand, in the second exemplary embodiment, by providing different tube diameters to each of cooling fluid inflow sections 5451 and each of cooling fluid outflow sections 5452 of a fluid branch section 545 as well as each of the fluid circulators 548 connecting the fluid branch section 545 and the respective optical modulator holders 446, the cooling fluid with different flow volumes can be introduced into the respective optical modulator holders 446.

Figure 9:
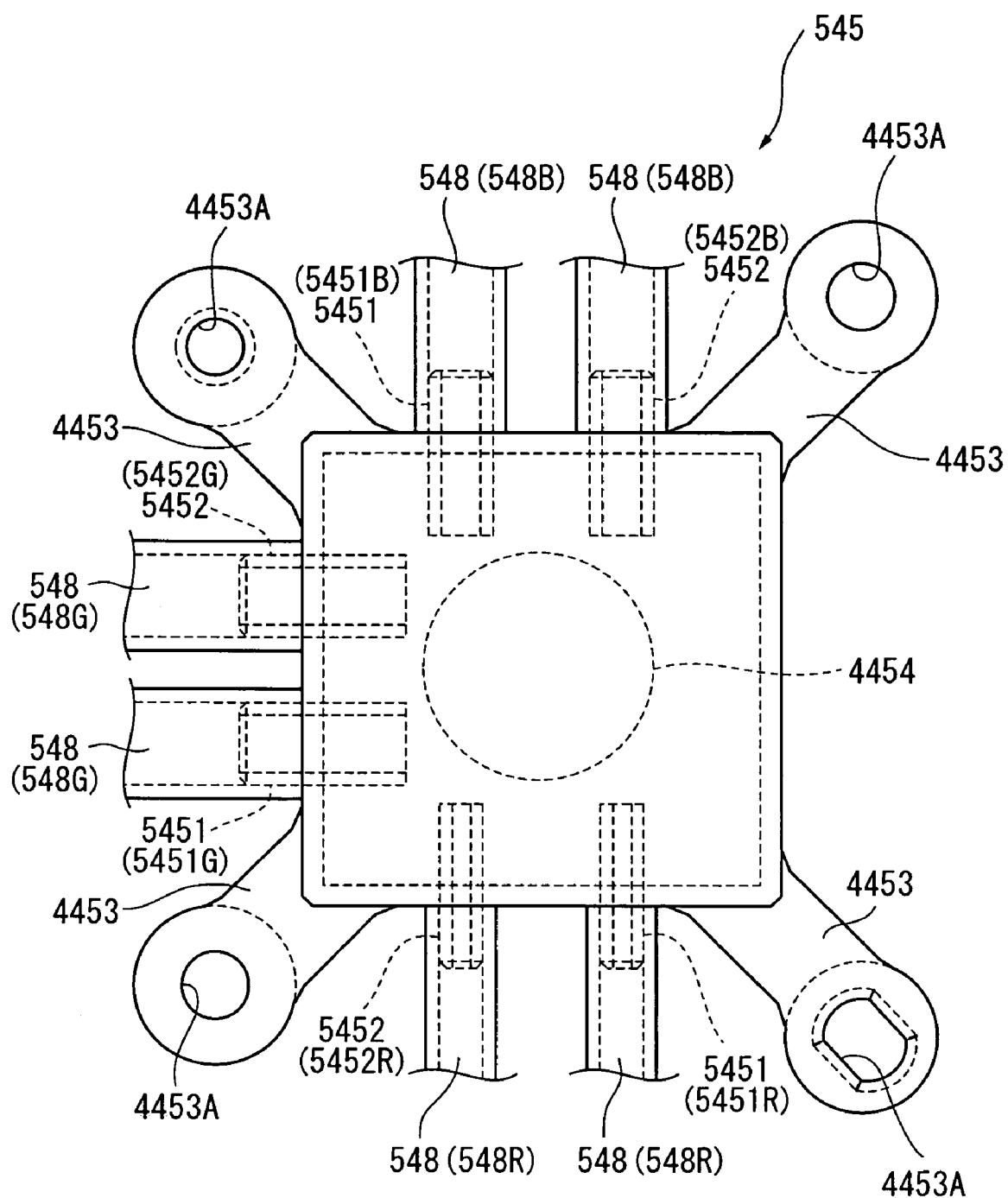
FIG. 9 is a plan view showing a fluid branch section and a fluid circulator connected to the fluid branch section of a second exemplary embodiment.

FIG. 9 is an illustration showing the fluid branch section 545 and the fluid circulators 548 connected to the fluid branch section 545 in the second exemplary embodiment. Specifically, FIG. 9 is a plan view showing the lower side of the fluid branch section 545.

The fluid branch section 545 has an arrangement substantially the same as the fluid branch section 445 described in the above first exemplary embodiment except that the tube diameters of the three cooling fluid inflow sections 5451 and the three cooling fluid outflow sections 5452 are different from each other.

In the present exemplary embodiment, tube diameters of a cooling fluid inflow section 5451G and a cooling fluid outflow section 5452G fluid-circulatably connected to the optical modulator holder 446 holding the liquid crystal panel 441G with the highest heat value are largest, tube diameters of a cooling fluid inflow section 5451B and a cooling fluid outflow section 5452B fluid-circulatably connected to the optical modulator holder 446 holding the liquid crystal panel 441B are smaller, and tube diameters of a cooling fluid inflow section 5451R and a cooling fluid outflow section 5452R fluid-circulatably connected to the optical modulator holder 446 holding the liquid crystal panel 441R are further smaller.

Each of the fluid circulators 548R, 548G and 548B of the fluid circulators 548 also has a tube diameter different from each other, corresponding to the tube diameter of each of the cooling fluid inflow sections 5451R, 5451G and 5451B and the cooling fluid outflow sections 5452R, 5452G and 5452B.

In the second exemplary embodiment described above, the tube diameters of the respective cooling fluid inflow sections 5451R, 5451G and 5451B, the respective cooling fluid outflow sections 5452R, 5452G and 5452B, and the respective fluid circulators 548R, 548G and 548B corresponding to the tube diameters of the inflow and cooling fluid outflow sections are different from each other in accordance with heat value of the respective liquid crystal panels 441. Thereby, as with the first exemplary embodiment, the cooling fluid can be supplied to the optical modulator holder 446 holding the liquid crystal panel 441G with the high heat value with large flow volume, while the cooling fluid can be supplied to the respective optical modulator holders 446 holding the other liquid crystal panels 441R and 441B with small flow volume. Therefore, the temperature of the respective liquid crystal panels 441 can be easily and highly precisely equalized with a simple arrangement. Accordingly, color of the respective optical image formed by the respective optical modulators 44A can be maintained properly.

Third Exemplary Embodiment

A third exemplary embodiment of the present invention will be described below with reference to the attached drawings.

In the following description, the same components as those in the first exemplary embodiment are indicated by the same reference symbols or numerals for omitting or simplifying the detailed description thereof.

In the first exemplary embodiment described above, in the optical device body 440, the cooling fluid circulates in the flow path from the fluid branch section 445 to the optical modulator holder 446 and back to the fluid branch section 445 through the plurality of fluid circulators 448 by natural convection.

On the other hand, in the third exemplary embodiment, the arrangement of an optical device body 640 differs from that of the first exemplary embodiment, where the cooling fluid is circulated forcibly. The arrangement in the third exemplary embodiment is substantially the same as that of the first exemplary embodiment except the optical device body 640, and thus only the arrangement of the optical device body 640 will be described below.

[Arrangement of Optical Device Body]

Figure 10A:
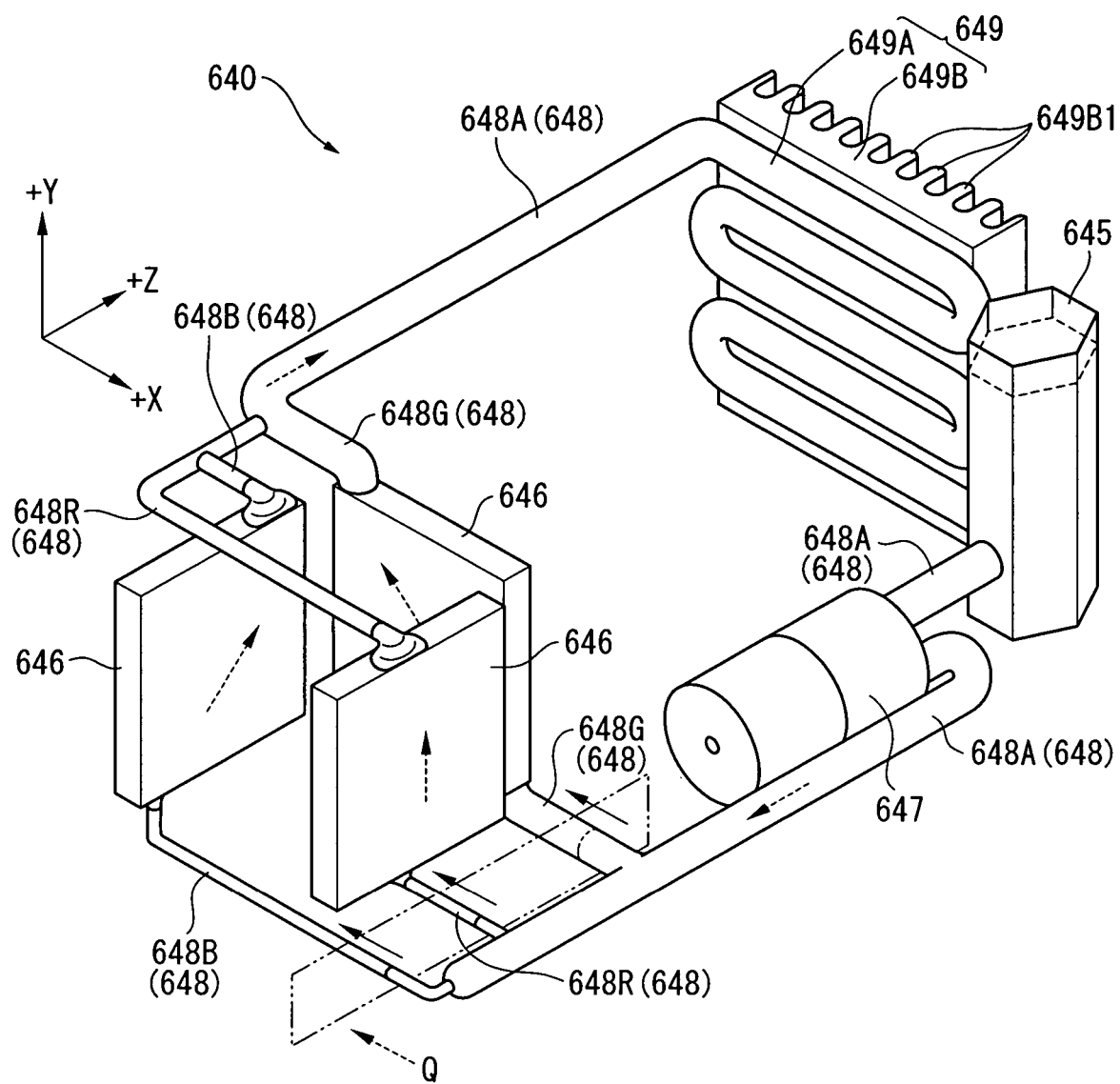
FIG. 10A is a perspective view showing the outline of an optical device body of a third exemplary embodiment.
Figure 10B:
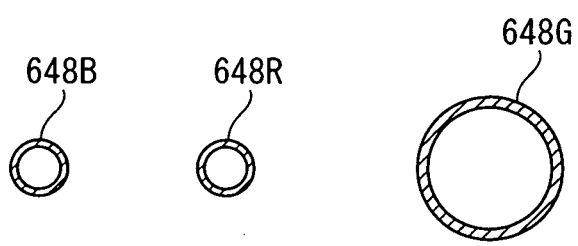
FIG. 10B is a cross section showing the outline of the optical device body of the aforesaid exemplary embodiment.

FIGS. 10A and 10B are illustrations each showing the outline of the optical device body 640 of the third exemplary embodiment. Specifically, FIG. 10A is a perspective view schematically showing the whole arrangement of the optical device body 640. FIG. 10B is a cross section cut along an imaginary plane shown by the chain double-dashed line in FIG. 10A viewed in Q direction. In FIG. 10A, for convenience of description, a direction opposite to the optical axis direction of the G color light is defined as Z axis, and two axes orthogonal to the Z axis are respectively defined as X axis and Y axis. In FIG. 10A, an optical modulator 44B is omitted.

The optical device body 640 includes three incident-side polarization plates 642 (FIG. 11), three irradiation-side polarization plates 643 (FIG. 11), a main tank 645, three optical modulator holders 646, a pump 647 as a fluid pressure-feed section, a plurality of fluid circulators 648 and a heat release section 649, in addition to the three liquid crystal panels 441 described in the above first exemplary embodiment.

[Arrangement of Incident-Side Polarization Plate and Irradiation-Side Polarization Plate]

The incident-side polarization plate 642 and the irradiation-side polarization plate 643 are absorptive polarization plates that only transmit a light beam having a predetermined polarization axis and absorb light beams not having the predetermined polarization axis. Transmission axes for the light beam transmitting the incident-side polarization plate 642 and the irradiation-side polarization plate 643 are arranged so as to be substantially orthogonal to each other. The liquid crystal panel 441, the incident-side polarization plate 642 and the irradiation-side polarization plate 643 are integrated to be attached and held on the light-irradiation side of the optical modulator holder 646. The liquid crystal panel 441, the incident-side polarization plate 642 and the irradiation-side polarization plate 643 are included in the optical modulator 44B (FIG. 11) of the present exemplary embodiment.

[Arrangement of Fluid Circulator]

As with the first exemplary embodiment, the plurality of fluid circulators 648 are aluminum tubular members in which the cooling fluid can convect, the fluid circulators 648 connecting the main tank 645, the three optical modulator holders 646, the pump 647 and the heat release section 649 so that the cooling fluid can circulate. As shown in FIG. 10A, the plurality of fluid circulators 648 includes main pipe 648A and respective color light pipes 648R, 648G and 648B.

The main pipe 648A is a main pipe circulating the cooling fluid in the optical device body 640, which has a flow path with the largest sectional area in the plurality of fluid circulators 648.

The respective color light pipes 648R, 648G and 648B introduces the cooling fluid circulating in the main pipe 648A into the respective optical modulator holders 646 and sends the cooling fluid discharged from the respective optical modulator holders 646 back to the main pipe 648A. As shown in FIG. 10B, in the respective color light pipes 648R, 648G and 648B, sectional area of the green light pipe 648G is the largest, and sectional areas of the red light pipe 648G (Translator's comment: 648R) and the blue light pipe 648B are substantially identical. The sectional area of the green light pipe 648G is substantially identical with that of the main pipe 648A.

[Arrangement of Main Tank]

The main tank 645 is an aluminum container-like member having a substantially hexagonal column shape, which temporarily stores the cooling fluid inside.

A portion on the +Y axis side of the main tank 645 most projects toward the +Y axis side in the optical device body 640. The portion projected toward the +Y axis side of the main tank 645 has a small air layer inside thereof. Thus, due to the gravity, air bubbles generated in the cooling fluid collect in air layer of the portion projected toward the +Y axis side in the main tank 645. The air layer can also absorb distortion caused by heat contraction of the respective optical modulator holders 646 and the respective fluid circulators 648 in association with the temperature change of the ambient air and absorb volume change of the cooling fluid.

[Arrangement of Pump]

The pump 647 introduces the cooling fluid housed in the main tank 645 through the main pipe 648A and forcibly sends the introduced cooling fluid to the outside through the main pipe 648A. The pump 647 is, for example, a centrifugal pump in which a DC servo motor drives a vane in an aluminum hollow member to push out the cooling fluid by rotation of the vane. Without limiting to the centrifugal pump described above, the pump 647 may be a piezo pump using a piezo element that is expanded and contracted as the voltage is applied for absorbing and discharging the cooling fluid.

[Arrangement of Optical Modulator Holder]

Figure 11:
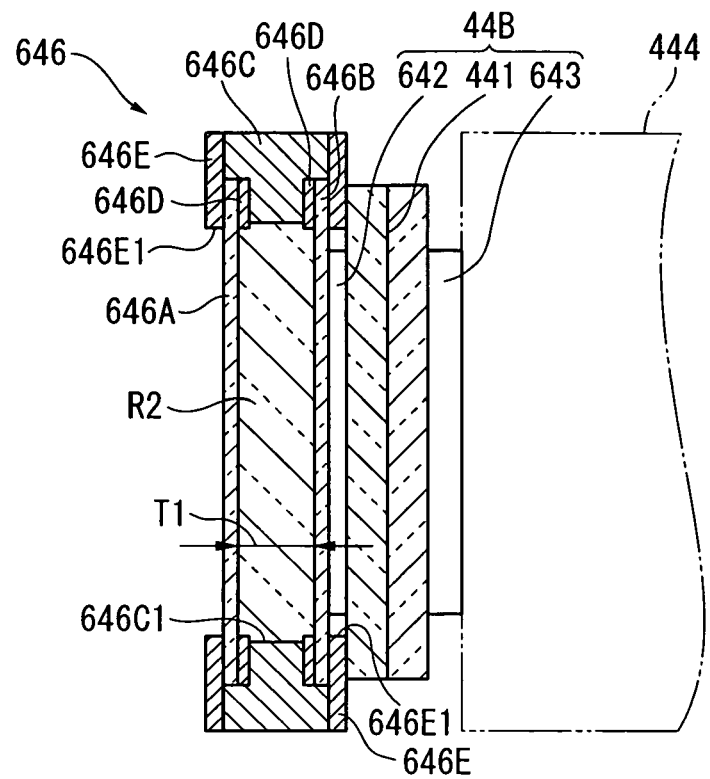
FIG. 11 is a cross section showing the outline of an optical modulator holder of the aforesaid exemplary embodiment.

FIG. 11 is a cross section showing the outline of the optical modulator holder 646. More specifically, FIG. 11 is a longitudinal cross section showing the optical modulator holder 646 and the optical modulator 44B held by the optical modulator holder 646.

The three optical modulator holders 646 respectively hold the three optical modulators 44B on the light-irradiation sides in a closely-contacted manner to respectively cool the three optical modulators 44B with the cooling fluid introduced into and discharged from the inside thereof. Each of the optical modulator holders 646 has the same arrangement, and thus only one of the optical modulator holders 646 will be described below.

As shown in FIG. 11, the optical modulator holder 646 includes an incident-side transmissive board 646A, an irradiation-side transmissive board 646B, a guiding frame 646C, a sealing member 646D and two fixing frames 646E.

The incident-side transmissive board 646A and the irradiation-side transmissive board 646B are made of sapphire glass having high transparency and heat transfer coefficient. Without limiting to the sapphire glass, the transmissive boards 646A and 646B may be made of, for example, a quartz glass having similar properties to the sapphire glass.

The guiding frame 646C is formed with a rectangular aluminum plate having an opening 646C1 substantially at the center thereof. The incident-side transmissive board 646A and the irradiation-side transmissive board 646B are disposed on the light-incident side and light-irradiation side of the opening 646C1 of the guiding frame 646C with the sealing members 646D interposed therebetween. By closing the light-incident side and light-irradiation side of the opening 646C1 with the respective transmissive boards 646A and 646B, a cooling chamber R2 to be filled with the cooling fluid is formed in the guiding frame 646C. Although not shown in detail, the guiding frame 646C has communication holes intercommunicating inside and outside of the cooling chamber R2, the communication holes being connected to the respective color light pipes 648R, 648G, and 648B described above. The cooling fluid forcibly sent out from the pump 647 through the main pipe 648A is introduced into the respective cooling chambers R2 through the respective color light pipes 648R, 648G and 648B and discharged to the outside of the cooling chambers R2 through the respective color light pipes 648R, 648G and 648B.

The sealing members 646D having a rectangular frame shape are disposed between the guiding frame 646C and the respective transmissive boards 646A, 646B, which prevents leakage of the cooling fluid from the cooling chamber R2 of the guiding frame 646C. The sealing member 646D is made of a heat-conductive silicone rubber. The sealing member 646D may be made of a material having heat conductance and sealing capability such as nitrile rubber, without limiting to silicone rubber.

The two fixing frames 646E are plates each having a rectangular frame shape with an opening 646E1 substantially at the center thereof. By connecting the fixing frames 646E with the guiding frame 646C, the respective transmissive boards 646A and 646B are fixed to the guiding frame 646C with the sealing members 646D interposed therebetween.

[Arrangement of Heat Release Section]

The heat release section 649 releases heat of the cooling fluid heated in the respective optical modulators 44B of the optical device body 640. As shown in FIG. 10A, the heat release section 649 includes a heat release pipe 649A and heat release fin 649B.

As shown in FIG. 10A, the heat release pipe 649A is made of aluminum, one end of the heat release pipe connected to the main pipe 648A into which the cooling fluid is introduced from the respective optical modulator holders 646 through the respective color light pipes 648R, 648G and 648B. The other end of the heat release pipe 649A is connected to the main tank 645. The heat release pipe 649A is curved and folded back in shape, which is disposed on the heat release fin 649B in a closely contacted manner.

The heat release fin 649B is made of aluminum having high heat-conductivity with a plurality of projected treads 649B1 on a side opposite to the side connected to the heat release pipe 649A. The plurality of projected treads 649B1 increases air contact area of the heat release fin 649B, so that the heat release effect can be enhanced.

As described above, the cooling fluid circulates, through the plurality of fluid circulators 648, in a flow path from the main tank 645 to the pump 647, the respective optical modulator holders 646, the heat release section 649, and back to the main tank 645.

[Cooling Mechanism]

Next, cooling mechanism of the optical modulator 44B will be described below.

When the pump 647 is driven, the cooling fluid in the main tank 645 is delivered into the main pipe 648A. Then, the cooling fluid delivered into the main pipe 648A is branched at the respective color light pipes 648R, 648G and 648B to be introduced into the respective cooling chambers R2 of the respective optical modulator holders 646. At this time, since the pressure applied to the cooling fluid is consistent and a route to the respective modulator holders 646, capacity of the respective cooling chambers R2 and a route from the respective optical modulator holders 646 are substantially identical, flow volume of the cooling fluid is proportional to sectional areas of the flow paths of the respective color light pipes 648R, 648G and 648B. Thus, largest flow volume of the cooling fluid is introduced into the green light pipe 648G. Further, when the flow volume of the cooling fluid increases, total amount of the cooling fluid increases accordingly, and thus the heat capacity increases. In a case where the same heat quantity is applied, temperature rise of the cooling fluid in the optical modulator holder 646 for green light is smaller than that of the optical modulator holders 646 of the other color lights. Therefore, more thermal energy can be absorbed.

The heat generated at the liquid crystal panel 441, incident-side polarization plate 642, and irradiation-side polarization plate 643 by the light beam irradiated from the light source device 411 is transferred to the cooling fluid in the respective cooling chambers R2 through the irradiation-side transmissive board 646B, guiding frame 646C, sealing member 646D, fixing frame 646E and the like of the optical modulator holder 646.

The cooling fluid heated by absorbing the respective optical modulators 44B unite at the main pipe 648A through the respective color light pipes 648R, 648G and 648B.

The cooling fluid discharged into the main pipe 648A from the respective cooling chambers R2 of the respective optical modulator holders 646 is then moved to the heat release section 649. When the heated cooling fluid passes through the heat release pipe 649A of the heat release section 649, the heat of the cooling fluid is transferred from the heat release pipe 649A to the heat release fin 649B to be released through the plurality of projected treads 649B1 of the heat release fin 649B.

Then, the cooling fluid cooled at the heat release section 649 moves from the heat release section 649 to the main tank 645, the pump 647, and back to the respective cooling chambers R2.

As with the first exemplary embodiment, due to the sirocco fan 31 of the cooling unit 3, cooling air circulates from the lower side to the upper side along outer sides of the optical modulator 44B and the optical modulator holder 646. The cooling air circulates while cooling optical modulator 44B and the optical modulator holder 646.

In the third exemplary embodiment, since the optical device body 640 includes the pump 647, it can forcibly circulate the cooling fluid with the pump 647, thereby securely convecting the cooling fluid in the respective cooling chambers R2 of the respective optical modulator holder 646. Therefore, great temperature difference between the respective optical modulators 44B and the cooling fluid can always be secured, so that cooling efficiency of the respective optical modulators 44B can be enhanced.

The sectional area of the flow path of the green light pipe 648G connected to the optical modulator holder 646 holding the optical modulator 44B with high heat value is larger than that of the red and blue light pipes 648R and 648B connected to the other optical modulator holders 646. Thus, in a manner substantially the same as the first exemplary embodiment, the cooling fluid can be supplied to the optical modulator holder 646 holding the optical modulator 44B for green light with high heat value with large flow volume, while the cooling fluid can be supplied to the optical modulator holders 646 respectively holding the optical modulators 44B for red and blue lights with small flow volume. Therefore, the temperature of the respective optical modulators 44B can be easily equalized with a simple arrangement. Accordingly, color of the optical image formed by the respective optical modulators 44B can be maintained properly.

Fourth Exemplary Embodiment

A fourth exemplary embodiment of the present invention will be described below with reference to the attached drawings.

In the following description, the same components as those in the third exemplary embodiment are indicated by the same reference symbols or numerals for omitting or simplifying the detailed description thereof.

In the third exemplary embodiment, only one pump 647 is provided in the optical device body 640, and the respective optical modulators 44B are cooled by the cooling fluid forcibly circulated by the pump 647.

On the other hand, in the fourth exemplary embodiment, two pumps 647 and 647G are provided in an optical device body 740. The pump 647G is a pump dedicated for cooling the optical modulator 44B for green light. In the three optical modulator holders 646, thickness of an optical modulator holder 646G holding the optical modulator 44B for green light is formed to be smaller than thickness of the other optical modulator holders 646. The other arrangements are the same as the third exemplary embodiment.

Figure 13:
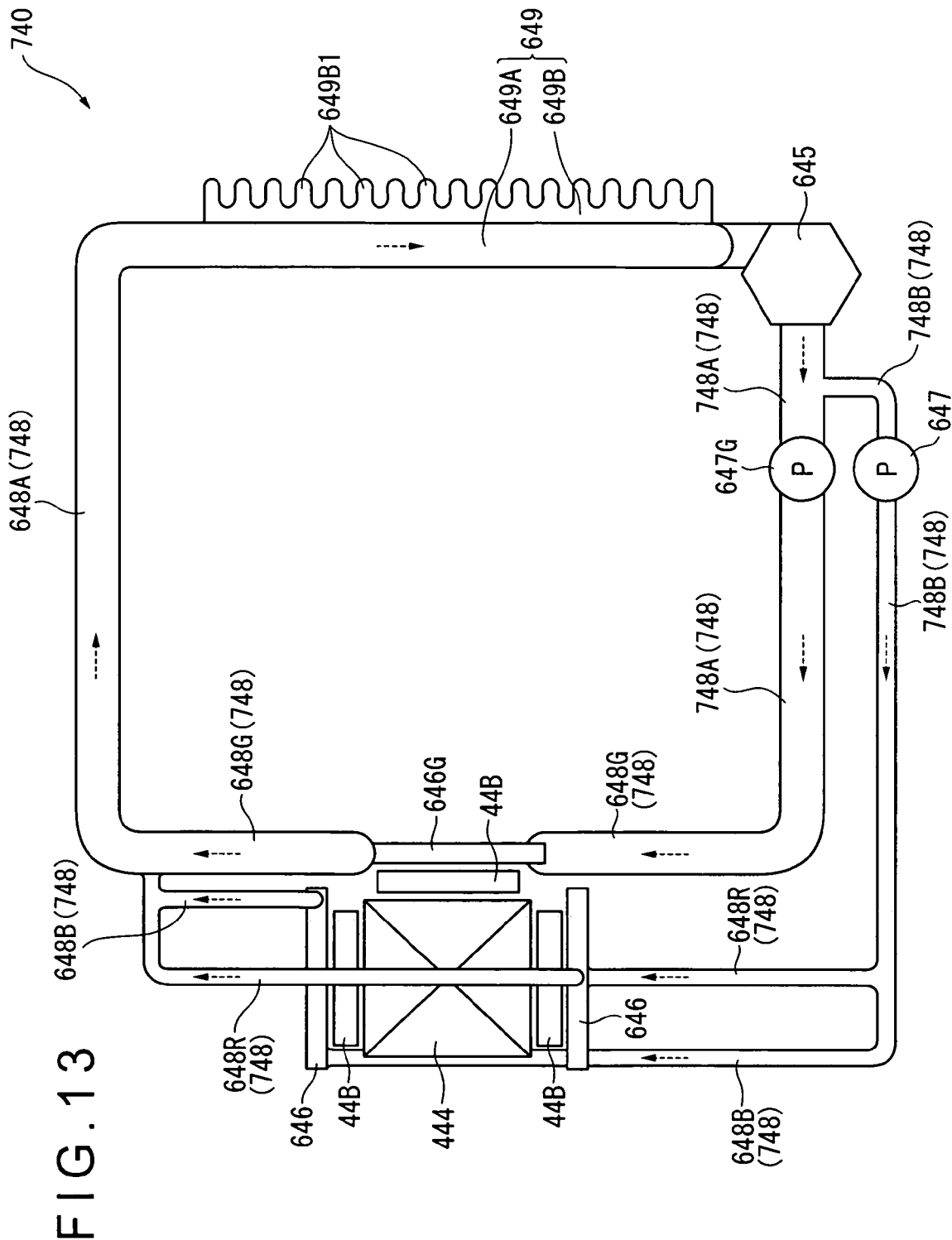
FIG. 13 is an illustration showing the outline of an optical device body of the aforesaid exemplary embodiment.

More specifically, FIG. 13 is an illustration showing the outline of the optical device body 740 of the fourth exemplary embodiment.

As shown in FIG. 13, the optical device body 740 includes the optical modulator holder 646G for green light, the pump 647G having the same arrangement as the pump 647 and a plurality of fluid circulators 748 in addition to the optical modulator 44B, the main tank 645, the optical modulator holders 646 for red and blue lights, the pump 647 and the heat release section 649 described in the third exemplary embodiment.

As shown in FIG. 13, the plurality of fluid circulators 748 include a first connection pipe 748A and a second connection pipe 748B, in addition to the main pipe 648A and the respective color light pipes 648R, 648G and 648B described in the third exemplary embodiments.

The first connection pipe 748A connects the main tank 645, the pump 647G and the green light pipe 648G. The first connection pipe 748A guides the cooling fluid forcibly sent out from the main tank 645 by the pump 647G to the green light pipe 648G. The sectional area of the first connection pipe 748A is substantially identical to that of the green light pipe 648G.

The second connection pipe 748B is branched from the first connection pipe 748A disposed between the main tank 645 and the pump 647G, and connects the pump 647, the red light pipe 648R and the blue light pipe 648B. The second connection pipe 748B guides the cooling fluid branched from the first connection pipe 748A to the red light pipe 648R and the blue light pipe 648B by the pump 647. The sectional area of the second connection pipe 748B is smaller than that of the first connection pipe 748A and larger than that of the red light pipe 648R or the blue light pipe 648B.

With the above arrangement, if the cooling fluid is sent out from the pumps 647 and 647G at the same pump pressure, larger volume of the cooling fluid is flown into the first connection pipe 748A and the green light pipe 648G having flow paths of larger sectional area and smaller resistance.

Figure 12:
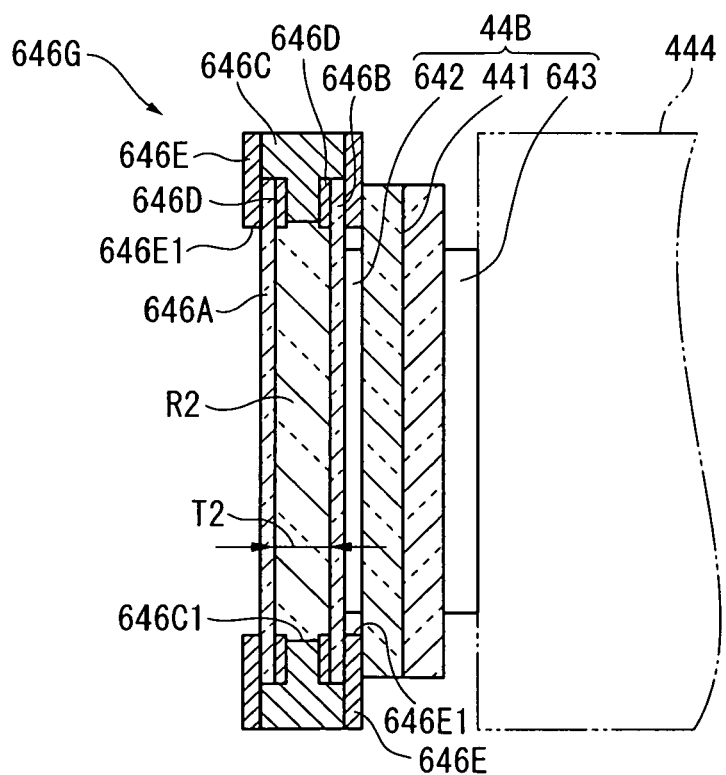
FIG. 12 is a cross section showing the outline of an optical modulator holder for a green light of a fourth exemplary embodiment.

FIG. 12 is a cross section showing the outline of the optical modulator holder 646G for green light. More specifically, FIG. 12 is a longitudinal cross section showing the optical modulator holder 646G and the optical modulator 44B held by the optical modulator holder 646G.

As shown in FIG. 12, the optical modulator holder 646G includes the incident-side transmissive board 646A, the irradiation-side transmissive board 646B, the guiding frame 646C, the sealing member 646D and the two fixing frames 646E in a manner same as the optical modulator holder 646 described in the third exemplary embodiment, the optical modulator holder 646G having a flow path with width T2 smaller than width T1 of the flow path of the respective optical modulator holders 646 for red and blue lights. For instance, value of the T2 is a half of that of T1. It is known that a flow rate of a liquid is lower in a wider flow path and higher in a narrower flow path when a consistent pressure is applied. Thus, since the flow path in the cooling chamber R2 of the optical modulator holder 646G for green light is narrower than the flow paths in the respective cooling chambers R2 of the respective optical modulator holders 646 for red and blue lights, the flow rate of the cooling fluid is higher. Further, the flow rate can be controlled by the pump 647G.

Cooling mechanism of the respective optical modulators 44B is substantially the same as the cooling mechanism described in the third exemplary embodiment, and thus the description thereof will be omitted.

In the above fourth exemplary embodiment, the optical device body 740 includes the two pumps 647 and 647G, and the pump 647G is a dedicated pump for green light for cooling the optical modulator 44B for green light. Thus, the flow volume can be controlled for the cooling fluid supplied to the optical modulator holder 646G holding the optical modulator 44B for green light with high heat value, so that the optical modulator 44B for green light with high heat value can be cooled efficiently. Therefore, the respective optical modulators 44B can be cooled efficiently.

The width T2 of the flow path for the cooling fluid to flow in the optical modulator holder 646G holding the optical modulator 44B for green light with high heat value is smaller than the width T1 of the flow path for the cooling fluid to flow in the respective optical modulator holders 646 for red and blue lights. Thus, the flow rate of the cooling fluid flowing in the cooling chamber R2 of the optical modulator holder 646G for green light is higher than that of the cooling fluid flowing in the respective cooling chambers R2 of the respective optical modulator holders 646 for red and blue lights. Therefore, temperature difference between the optical modulator 44B for green light with high heat value and the cooling fluid can be reduced efficiently, and thereby the optical modulator 44B for green light with high heat value can be cooled further efficiently.

Fifth Exemplary Embodiment

A fifth exemplary embodiment of the present invention will be described below with reference to the attached drawings.

In the following description, the same components as those in the third exemplary embodiment are indicated by the same reference symbols or numerals for omitting or simplifying the detailed description thereof.

In the third exemplary embodiment, only one pump 647 is provided in the optical device body 640, and the respective optical modulators 44B are cooled by the cooling fluid forcibly circulated by the pump 647.

On the other hand, in the fifth exemplary embodiment, an optical device body 840 includes an independent first optical device body 841 dedicated for cooling the optical modulator 44B for green light and a second optical device body 842 for cooling the optical modulators 44B for red and blue lights. The other arrangements are the same as the third exemplary embodiment.

Figure 14:
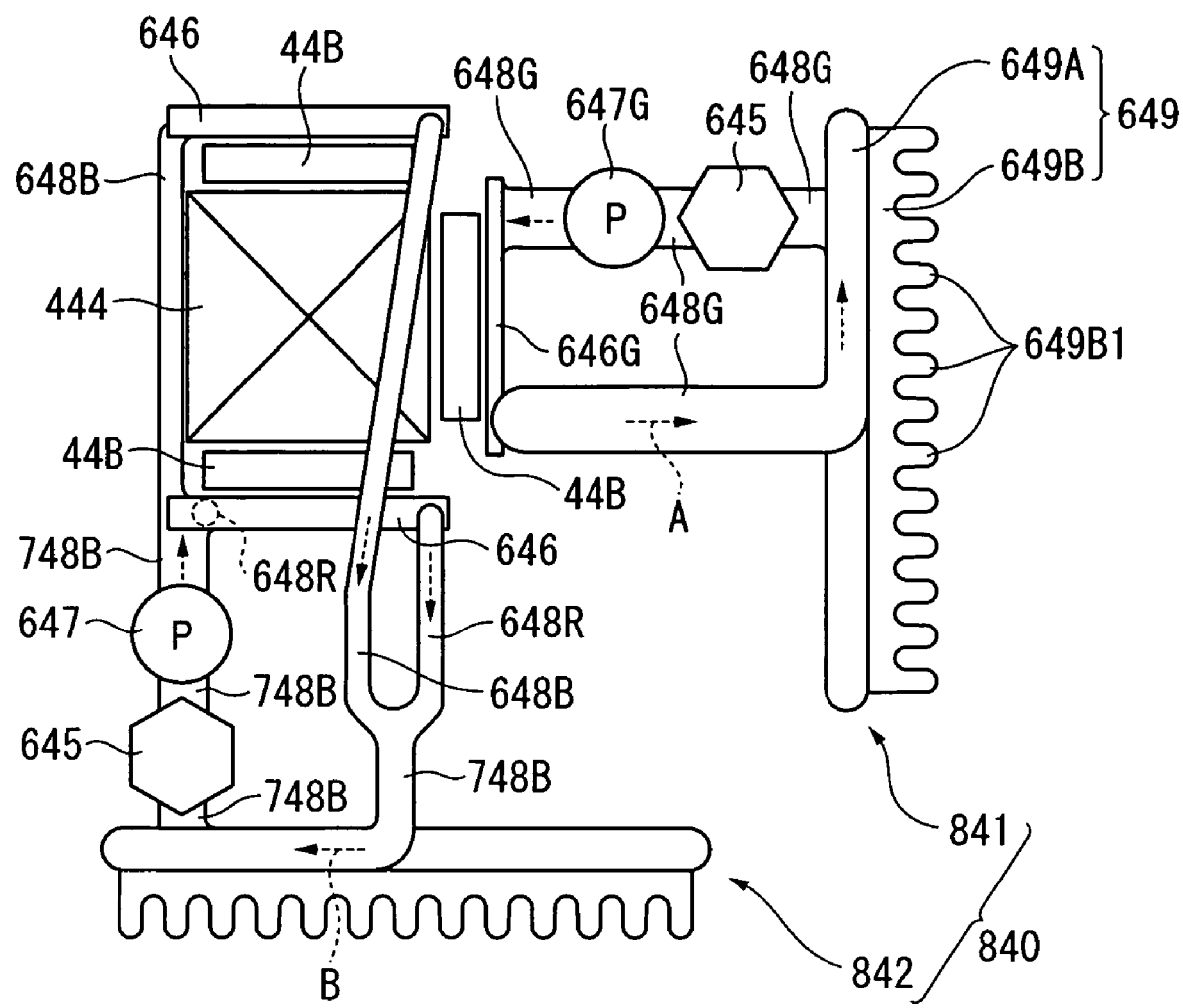
FIG. 14 is an illustration showing the outline of an optical device body of a fifth exemplary embodiment.

More specifically, FIG. 14 is an illustration showing the outline of the optical device body 840 of the fifth exemplary embodiment.

As shown in FIG. 14, the first optical device body 841, in which the optical modulator 44B for green light is held by the optical modulator holder 646G, is connected to the main tank 645, the pump 647G, the optical modulator holder 646G and the heat release section 649 through the green light pipe 648G. The cooling fluid circulates, through the green light pipe 648G, in a first flow path A from the main tank 645 to the pump 647G, the optical modulator holder 646G, the heat release section 649, and back to the main tank 645.

As shown in FIG. 14, the second optical device body 842, in which the respective optical modulators 44B for red and blue lights are held by the two optical modulator holders 646, is connected to the main tank 645, the pump 647, the respective optical modulator holders 646 and the heat release section 649 through the red light pipe 648R, blue light pipe 648B and the second connection pipe 748B. The cooling fluid circulates, through the red light pipe 648R, blue light pipe 648B and the second connection pipe 748B, in a second flow path B from the main tank 645 to the pump 647, the respective optical modulator holders 646, the heat release section 649, and back to the main tank 645.

Cooling mechanism of the respective optical modulators 44B is substantially the same as the cooling mechanism described in the third exemplary embodiment, and thus the description thereof will be omitted.

In the above fifth exemplary embodiment, the optical device body 840 includes the first optical device body 841 having the first flow path A and the second optical device body 842 having the second flow path B, which cools the optical modulator 44B for green light with high heat value by the cooling fluid circulating in the first flow path A, and cools the respective optical modulators 44B for red and blue lights by the cooling fluid circulating in the second flow path B. The first flow path A and the second flow path B are independent of each other. Thus, the respective optical modulators 44B can function under proper temperature, so that the respective optical modulators 44B can be cooled efficiently. Further, since the respective optical modulators 44B can function under proper temperature, the performance of the respective optical modulators 44B can be maintained for a long period of time.

Six Exemplary Embodiment

A sixth exemplary embodiment of the present invention will be described below with reference to the attached drawings.

In the following description, the same components as those in the fourth exemplary embodiment are indicated by the same reference symbols or numerals for omitting or simplifying the detailed description thereof.

An optical device body 940 of the present exemplary embodiment differs from the fourth exemplary embodiment only in the point that the optical device body 940 further includes: temperature sensors 941, 942 and 943 as temperature detectors for detecting temperature of the cooling fluid respectively circulating on the red, green and blue light sides; and a controller 944 for controllably driving the pump 647 and 647G based on the temperature detected by the temperature sensors 941, 942 and 943, in addition to the optical device body 740 described in the fourth exemplary embodiment. The other arrangements of the optical device body 940 are the same as that of the fourth exemplary embodiment.

Figure 15:
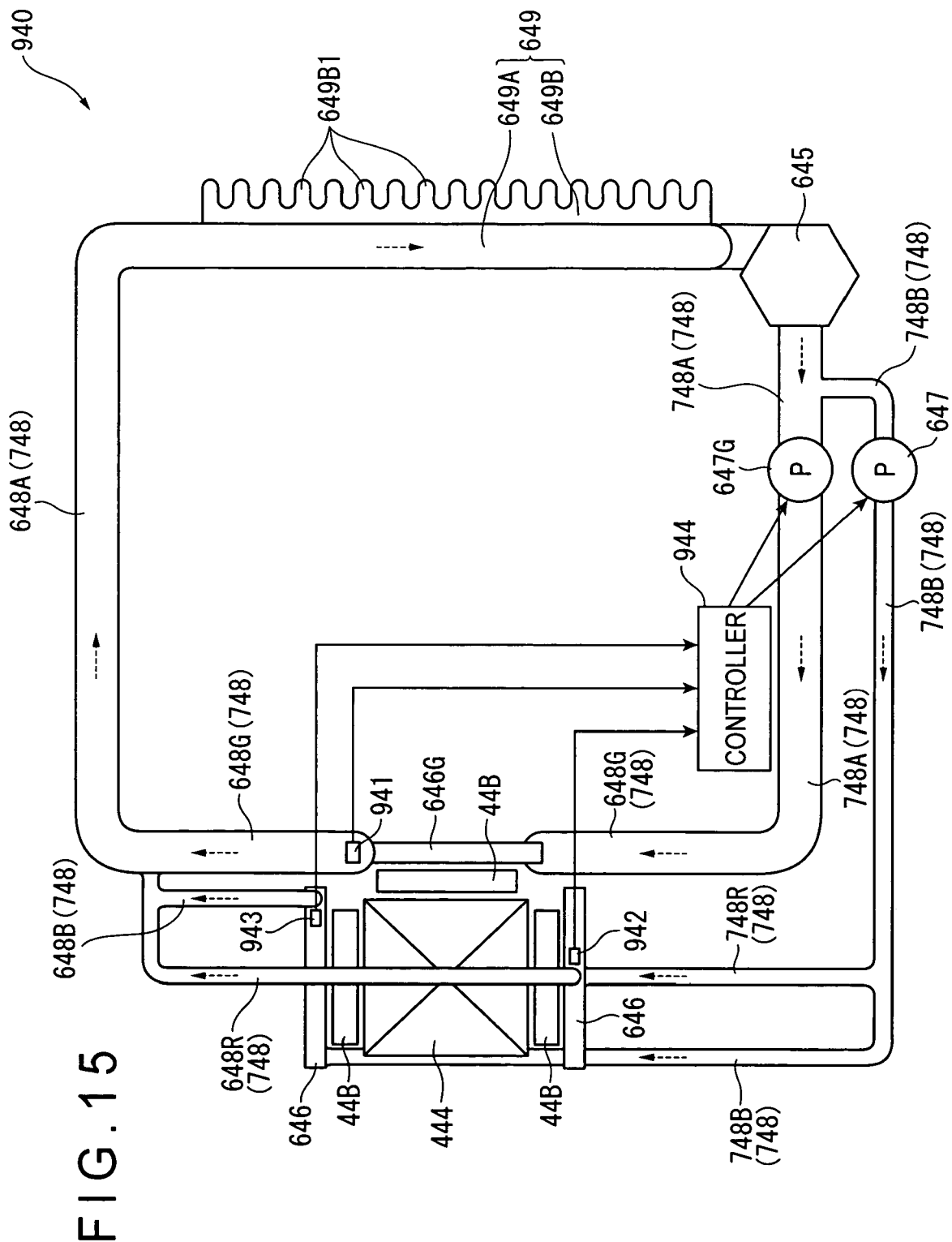
FIG. 15 is an illustration showing the outline of an optical device body of a sixth exemplary embodiment.

Specifically, FIG. 15 is an illustration showing the outline of the optical device body 940 of the sixth exemplary embodiment.

The temperature sensor 941 is attached on an inner wall of a joint portion of the optical modulator holder 646G for green light and the green light pipe 648G on the outflow side. The temperature sensor 941 employs a thermistor, which detects temperature of the cooling fluid after absorbing thermal energy of the optical modulator 44B for green light. A detected signal from the temperature sensor 941 is sent to the controller 944, where the detected signal is converted to a predetermined signal type through A/D conversion or the like. The controller 944 prestores a target temperature required for securing a predetermined performance of the respective optical modulators 44B. The controller 944 compares a temperature detected by the temperature sensor 941 with the target temperature, and adjusts the rotation speed of the pump 647G through PID (Proportional Integral Differential) control to control flow volume of the cooling fluid so that the temperature of the cooling fluid is equalized with the target temperature.

Similarly, the temperature sensors 942 and 943 are also attached to the respective optical modulator holders 646 for red and blue lights. The controller 944 compares temperatures detected by the temperature sensors 942 and 943 with corresponding target temperatures, and adjusts the rotation speed of the pump 647 through PID control to control flow volume of the cooling fluid so that the temperatures of the cooling fluid are equalized with the target temperatures.

In the sixth exemplary embodiment described above, since the optical device body 940 includes the temperature sensors 941, 942 and 943 and the controller 944, the controller 944 compares temperatures detected by the temperature sensors 941, 942 and 943 with target temperature and controllably drives the respective pumps 647 and 647G to adjust flow volume of the cooling fluid fed by the respective pumps 647 and 647G so that the temperatures of the cooling fluid are equalized with the target temperature. Therefore, the respective optical modulators 44B can be maintained around the target temperature, so that the performance of the respective optical modulators 44B can be maintained for a long period of time.

Since the pump 647G for green light dedicated for feeding the cooling fluid to the optical modulator holder 646G holding the optical modulator 44B with high heat value is provided, the flow volume of the cooling fluid can precisely adjusted for the optical modulator 44B for green light with high heat value by controlling drive of the pump 647G with the controller 944.

While the present invention has been described above with the preferable exemplary embodiments, the present invention is not limited to the above-described exemplary embodiments, but includes improvements and modifications as long as an object of the present invention can be achieved.

In each of the exemplary embodiments described above, arrangements of the optical modulator holders 446, 646 and 646G are not limited to the ones described in the exemplary embodiments. Any arrangements may be employed, as long as the optical modulator holders can hold at least a part (liquid crystal panel 441, etc.) of the optical modulator.

For instance, in the first and second exemplary embodiments described above, the incident-side and irradiation-side of the opening 4462A of the optical modulator holder 446 are respectively closed with the two transmissive boards 4464. Then, the liquid crystal panel 441 may be closely attached to one of the two transmissive boards 4464 in a manner substantially the same as the third to sixth exemplary embodiments. In such case, the incident-side polarization plate 442 and/or the irradiation-side polarization plate 443 may be formed with an absorptive polarizer and integrated with the liquid crystal panel 441 to be closely attached to one of the two transmissive boards 4464.

In the first and second exemplary embodiments described above, for instance, the transmissive board 4464 may be disposed on the incident-side of the frame member 4462 and the transmissive board 4464 may also be disposed on the irradiation-side of the frame member 4461. By respectively closing opposing sides and sides opposite to the opposing sides of the respective openings 4461A and 4462A of the pair of the frame members 4461 and 4462 with the liquid crystal panel 441 and the two transmissive boards 4464, cooling chambers are respectively formed in both of the pair of frame members 4461 and 4462. In such arrangement, since the cooling chambers are respectively formed on the incident-side and irradiation-side of the liquid crystal panel 441, cooling efficiency of the liquid crystal panel 441 can further be enhanced. Also in the above arrangement, the incident-side polarization plate 442 and/or the irradiation-side polarization plate 443 may be formed as an absorptive polarizer. Then, the incident-side polarization plate and/or irradiation-side plate polarizer as the absorptive polarizer may be disposed instead of the transmissive boards 4464.

In the third to sixth exemplary embodiments, the optical modulator 44B may be closely attached to the incident-side transmissive board 646A. As another arrangement, the optical modulator 44B may be divided into the incident-side polarization plate 642/liquid crystal panel 441 and the irradiation side polarization plate 643, or divided into the incident-side polarization plate 642 and the liquid crystal panel 441/irradiation-side polarization plate 643, which may be respectively attached closely to the incident-side transmissive board 646A and the irradiation-side transmissive board 646B. Further, the incident-side transmissive board 646A and the irradiation-side transmissive board 646B may be omitted, and the incident-side and irradiation-side of the opening 646C1 of the guiding frame 646C may be closed with the above-described divided components.

In the first and second exemplary embodiments, an arrangement in which the cooling fluid convects by natural convection in the optical device bodies 440 and 540. However, a fluid pressure-feed section such as the pump 647 and 647G described in the third to sixth exemplary embodiments may be provided in the flow path of the cooling fluid in the optical device bodies 440 and 540 to forcibly circulate the cooling fluid.

In the first and second exemplary embodiments, the optical device bodies 440 and 540 include the fluid branch sections 445 and 545, but the fluid branch sections 445 and 545 may be omitted. In other words, the inflow ports 4462D and the outflow ports 4462E of the respective optical modulator holders 446 may be directly connected through the fluid circulators 448 and 548. At this time, with the first exemplary embodiment, the volume changers 449 are provided in the flow paths of the respective fluid circulators 448 connected to the respective optical modulator holders 446. With the second exemplary embodiment, tube diameters of the respective fluid circulators 548R, 548G and 548B connected to the respective optical modulator holders 446 are different in accordance with the heat values of the respective liquid crystal panels 441. An object of the present invention can also be sufficiently accomplished with such arrangement.

In the respective exemplary embodiments, the fluid circulators 448, 548, 648 and 748, the fluid branch sections 445 and 545, the frame members 4461 and 4462, the guiding frame 646C, the main tank 645, the pumps 647 and 647G, and the heat release pipe 649A are aluminum members, but the arrangement is not limited thereto. Without limiting to aluminum, any other materials having corrosion resistivity such as oxygen-free copper or duralumin may also be employed.

As the fluid circulators 448, 548, 648 and 748, butyl rubber or fluorocarbon rubber having low hardness and capable of restraining the pixel displacement with small deformation reaction force to the optical modulator holders 446, 646 and 646G may also be employed.

In the first exemplary embodiment described above, the arrangement having the three volume changers 449 corresponding to the respective liquid crystal panels 441 is employed, but an arrangement with one or two flow volume changers may also be employed. In the arrangement described above, the volume changers 449 are provided to the cooling fluid outflow sections 4452 of the fluid branch sections 445, but the volume changer 449 may also be provided to the fluid circulator 448 connected to the cooling fluid outflow section 4452. The arrangement of the volume changer 449 is not limited to the one described in the first exemplary embodiment described above, but any arrangement may be employed as long as a valve is provided in the flow path of the cooling fluid for narrowing and widening the flow path by changing the position of the valve.

The volume changer 449 of the first exemplary embodiment may be applied to the optical device bodies 640, 740, 840 and 940 in the third to sixth exemplary embodiments. For instance, the volume changer 449 may be provided in the fluid circulators 648 and 748 on the inflow side of the respective optical modulator holders 646 and 646G. In such arrangement, sectional areas of the flow paths for the respective color light pipes 648R, 648G and 648B do not have to be different, facilitating manufacturing of the optical device body 640, 740, 840 and 940.

In the second exemplary embodiment described above, the respective tube diameters of the respective cooling fluid inflow sections 5451 and the respective cooling fluid outflow sections 5452 of the fluid branch section 545 and the fluid circulators 548 connected thereto are different from each other. However, the arrangement is not limited thereto, but the only one of the respective tube diameters may be smaller or larger than the other tube diameters.

In the fourth exemplary embodiment described above, sectional areas of the flow paths of the respective color light pipes 648R, 648G and 648G (Translator's comment: 648B) are different, the arrangement is not limited thereto. For instance, the sectional areas of the flow paths of the respective color light pipes 648R, 648G and 648B may be substantially identical. Then, the flow volume of the cooling fluid fed by the pump 647G should be larger than that of the cooling fluid fed by the pump 647. With such arrangement, flow volume of the cooling fluid introduced into the cooling chamber R2 of the optical modulator holder 646G is larger than that of the cooling fluid introduced into the cooling chamber R2 of the other optical modulator holders 646, so that the optical modulator 44B for green light with high heat value can be cooled efficiently. The above arrangement may also be applied to the fifth and sixth exemplary embodiments described above.

In the fifth exemplary embodiment, the first flow path A corresponding to the optical modulator 44B for green light and the second flow path B corresponding to the respective optical modulators 44B for red and blue lights are formed, but the arrangement is not limited thereto. For instance, three flow paths corresponding to the respective optical modulators may be formed so that the three flow paths are independent of each other.

Further, the temperature sensors 941, 942 and 943 and the controller 944 in the sixth exemplary embodiment may be applied to the fourth and fifth exemplary embodiments to controllably drive the pumps 647 and 647G based on the temperature of the cooling fluid, in a manner substantially the same as the sixth exemplary embodiment.

In the respective exemplary embodiments, the arrangement in which the large volume of the cooling fluid is flowed in the optical modulator holders 446 and 646G for green light among the optical modulator holders 446, 646 and 646G for red, green and blue lights is described, but the arrangement is not limited thereto. Considering the heat values of the respective optical modulators 44A and 44B, and if, for instance, the heat value of the optical modulator 44A and 44B for blue light is high, large volume of the cooling fluid may be flown into the optical modulator holders 446 and 646 for blue light.

In the respective exemplary embodiments, an arrangement having the optical unit 4 having a substantially L-shape in plan view is exemplified, but for instance, an arrangement having a substantially U-shape in plan view may also be employed.

In the respective exemplary embodiments described above, only the example with the projector 1 having three optical modulators 44A and 44B is described. However, the present invention can also be applied to projectors having two optical modulators or the one having four or more optical modulators.

In the respective exemplary embodiments described above, the optical modulators 44A and 44B having the transmissive liquid crystal panel having different light-incident side and light-irradiation side is employed. However, the reflective liquid crystal panel having the same incident-side and irradiation side may also be employed.

In the respective exemplary embodiments described above, the optical modulators 44A and 44B having the liquid crystal panel 441 is employed, but an optical modulator other than liquid crystal panel such as a device using a micro mirror may also be employed. In such case, the incident-side and irradiation-side polarization plate can be omitted.

In the respective exemplary embodiments, only a front-type projector that projects an image in a direction for observing a screen is exemplified, but the present invention may also be applied to a rear-type projector that projects an image in a direction opposite to the direction for observing the screen.

Although the best mode for implementing the present invention has been disclosed above, the present invention is not limited thereto. In other words, while the present invention is mainly illustrated and described on the specific exemplary embodiments, a person skilled in the art can modify the specific arrangement such as shape, material, quantity in the above-described exemplary embodiments as long as a technical idea and an object of the present invention can be achieved.

Therefore, the description limiting the shapes and the materials disclosed above is intended to be illustrative for easier understanding and not to limit the invention, hence the present invention includes the description using a name of component without a part of or all of the limitation on the shape and the material etc.

The priority application Number 2003-433306 upon which this patent application is based is hereby incorporated by reference.

The invention claimed is:

1. An optical device including a plurality of optical modulators that modulate a light beam irradiated from a light source in accordance with image information, the optical device comprising:
    a plurality of optical modulator holders respectively holding the plurality of optical modulators and respectively having cooling chambers with a cooling fluid sealed therein to respectively cool the plurality of optical modulators with the cooling fluid in the respective cooling chambers; and
    a plurality of fluid circulators intercommunicated with the plurality of optical modulator holders to guide the cooling fluid to the outside of the respective cooling chambers and to re-introduce the cooling fluid into the respective cooling chambers,
    wherein a flow volume of the cooling fluid circulating in the respective optical modulator holders can be independently changed in accordance with heat values of the plurality of optical modulators, and
    wherein the plurality of fluid circulators include tubular members, tube diameters of which are different from each other in accordance with the heat values of the plurality of optical modulators.

2. The optical device according to claim 1, further comprising a flow volume changer disposed in a flow path of the cooling fluid and capable of changing the flow volume of the cooling fluid circulated in the respective optical modulator holders in accordance with the heat values of the plurality of optical modulators.

3. The optical device according to claim 1, wherein the plurality of fluid circulators are so formed that sectional areas of the flow paths in the fluid circulators are different from each other in accordance with the heat values of the plurality of optical modulators.

4. The optical device according to claim 1, further comprising a fluid pressure-feed section disposed in the flow paths of the cooling fluid in the plurality of fluid circulators and adapted to feed the cooling fluid to the respective optical modulator holders through the plurality of fluid circulators to forcibly circulate the cooling fluid.

5. The optical device according to claim 4, wherein the fluid pressure-feed section includes a plurality of fluid pressure-feed sections, and
    at least one of the plurality of fluid pressure-feed sections feeds the cooling fluid only to a predetermined optical modulator holder of the plurality of optical modulator holders through the plurality of fluid circulators.

6. The optical device according to claim 4, wherein
    the fluid pressure-feed section includes a plurality of fluid pressure-feed sections,
    at least any one of the plurality of fluid circulators connects a predetermined optical modulator holder of the plurality of optical modulator holders and at least one of the plurality of fluid pressure-feed sections to form a first flow path in which the cooling fluid can circulate,
    other fluid circulators of the plurality of fluid circulators connect other optical modulator holders excluding the predetermined optical modulator holder of the plurality of optical modulator holders and other fluid pressure-feed sections of the plurality of fluid pressure-feed sections to form a second flow path in which the cooling fluid can circulate, and
    the first flow path and the second flow path are independent of each other.

7. The optical device according to claim 5, further comprising:
    a temperature detector for detecting temperature of the cooling fluid for each of the plurality of optical modulators; and
    a controller for controllably driving the plurality of fluid pressure-feed sections to change the flow volume of the cooling fluid based on temperature information detected by the temperature detector.

8. The optical device according to claim 6, further comprising:
    a temperature detector detecting temperature of the cooling fluid for each of the plurality of optical modulators; and
    a controller for controlling drives of the plurality of fluid pressure-feed sections to change the flow volume of the cooling fluid based on temperature information detected by the temperature detector.

9. A projector comprising:
    a light source device;
    an optical device including a plurality of optical modulators for modulating a light beam irradiated from the light source device in accordance with image information; and
    a projection optical device for projecting an optical image formed by the optical device in an enlarged manner,
    the optical device including:
        a plurality of optical modulator holders respectively holding the plurality of optical modulators and respectively having cooling chambers with a cooling fluid sealed therein to respectively cool the plurality of optical modulators with the cooling fluid in the respective cooling chambers; and
        a plurality of fluid circulators intercommunicated with the plurality of optical modulator holders to guide the cooling fluid to the outside of the respective cooling chambers and to re-introduce the cooling fluid into the respective cooling chambers,
    wherein a flow volume of the cooling fluid circulated in the respective optical modulator holders can be independently changed in accordance with heat values of the plurality of optical modulators,
    wherein the plurality of fluid circulators are so formed that sectional areas of the flow paths in the fluid circulators are different from each other in accordance with the heat values of the plurality of optical modulators, and wherein the plurality of fluid circulators include tubular members, tube diameters of which are different from each other in accordance with the heat values of the plurality of optical modulators.

10. The projector according to claim 9, further comprising a flow volume changer disposed in a flow path of the cooling fluid and capable of changing the flow volume of the cooling fluid circulated in the respective optical modulator holders in accordance with the heat values of the plurality of optical modulators.

11. The projector according to claim 9, further comprising a fluid pressure-feed section disposed in the flow paths of the cooling fluid in the plurality of fluid circulators and adapted to feed the cooling fluid to the respective optical modulator holders through the plurality of fluid circulators to forcibly circulate the cooling fluid.

12. The projector according to claim 11, wherein
the fluid pressure-feed section includes a plurality of fluid pressure-feed sections, and
at least one of the plurality of fluid pressure-feed sections feeds the cooling fluid only to a predetermined optical modulator holder of the plurality of optical modulator holders through the plurality of fluid circulators.

13. The projector according to claim 11, wherein
the fluid pressure-feed section includes a plurality of fluid pressure-feed sections,
at least any one of the plurality of fluid circulators connects a predetermined optical modulator holder of the plurality of optical modulator holders and at least one of the plurality of fluid pressure-feed sections to form a first flow path in which the cooling fluid can circulate,
other fluid circulators of the plurality of fluid circulators connect other optical modulator holders excluding the predetermined optical modulator holder of the plurality of optical modulator holders and other fluid pressure-feed sections of the plurality of fluid pressure-feed sections to form a second flow path in which the cooling fluid can circulate, and
the first flow path and the second flow path are independent of each other.

14. The projector according to claim 12, further comprising:
a temperature detector for detecting temperature of the cooling fluid for each of the plurality of optical modulators; and
a controller for controllably driving the plurality of fluid pressure-feed sections to change the flow volume of the cooling fluid based on temperature information detected by the temperature detector.

15. The projector according to claim 13, further comprising:
a temperature detector detecting temperature of the cooling fluid for each of the plurality of optical modulators; and
a controller for controlling drives of the plurality of fluid pressure-feed sections to change the flow volume of the cooling fluid based on temperature information detected by the temperature detector.

16. A projector comprising:
a light source device;
an optical device including a plurality of optical modulators for modulating a light beam irradiated from the light source device in accordance with image information, the optical device including:
a plurality of optical modulator holders respectively holding the plurality of optical modulators and respectively having cooling chambers with a cooling fluid sealed therein to respectively cool the plurality of optical modulators with the cooling fluid in the respective cooling chambers; and
a plurality of fluid circulators intercommunicated with the plurality of optical modulator holders to guide the cooling fluid to the outside of the respective cooling chambers and to re-introduce the cooling fluid into the respective cooling chambers;
a projection optical device for projecting an optical image formed by the optical device in an enlarged manner; and
a fluid pressure-feed section disposed in the flow paths of the cooling fluid in the plurality of fluid circulators and adapted to feed the cooling fluid to the respective optical modulator holders through the plurality of fluid circulators to forcibly circulate the cooling fluid,
wherein a flow volume of the cooling fluid circulated in the respective optical modulator holders can be independently changed in accordance with heat values of the plurality of optical modulators,
wherein the fluid pressure-feed section includes a plurality of fluid pressure-feed sections,
wherein at least any one of the plurality of fluid circulators connects a predetermined optical modulator holder of the plurality of optical modulator holders and at least one of the plurality of fluid pressure-feed sections to form a first flow path in which the cooling fluid can circulate,
wherein other fluid circulators of the plurality of fluid circulators connect other optical modulator holders excluding the predetermined optical modulator holder of the plurality of optical modulator holders and other fluid pressure-feed sections of the plurality of fluid pressure-feed sections to form a second flow path in which the cooling fluid can circulate, and
wherein the first flow path and the second flow path are independent of each other.

* * * * *